United States Patent [19]

Finlay et al.

[11] 4,213,190
[45] Jul. 15, 1980

[54] PROGRAMMED COPIER CONTROL

[75] Inventors: David E. Finlay, Boulder; Wayne E. Robbins, Longmont; Terence Travis, Boulder, all of Colo.

[73] Assignee: International Business Machines Corporation, Armonk, N.Y.

[21] Appl. No.: 937,396

[22] Filed: Aug. 28, 1978

[51] Int. Cl.² ........................................ G03G 15/00
[52] U.S. Cl. ...................................... 364/900
[58] Field of Search ... 364/200 MS File, 900 MS File; 355/14

[56]  References Cited

U.S. PATENT DOCUMENTS

| | | | |
|---|---|---|---|
| 3,017,092 | 1/1962 | Rent et al. | 364/200 |
| 3,414,254 | 12/1968 | Snellman et al. | 270/58 |
| 3,936,182 | 2/1976 | Sheikh | 355/14 |
| 4,035,072 | 7/1977 | Deetz et al. | 355/14 |
| 4,084,228 | 4/1978 | Dufond et al. | 364/200 |
| 4,086,658 | 4/1978 | Finlay | 364/900 |
| 4,156,133 | 5/1979 | Legg | 235/92 SB |

OTHER PUBLICATIONS

The IBM Copier II, Manual 241-5761-1, 1970.

*Primary Examiner*—Raulfe B. Zache
*Attorney, Agent, or Firm*—Carl M. Wright

[57] ABSTRACT

A copy production machine controlled by a programmed computer in which the computer control programs include synchronous and asynchronous portions. The asynchronous portions are repetitively executed in loop form for checking operating components and servicing operator control panels. The synchronous portions are executed in timed relation to the operation of the machine. The execution of the programs is coordinated via a set of memory registers accessible by the computer during execution of both program portions.

9 Claims, 16 Drawing Figures

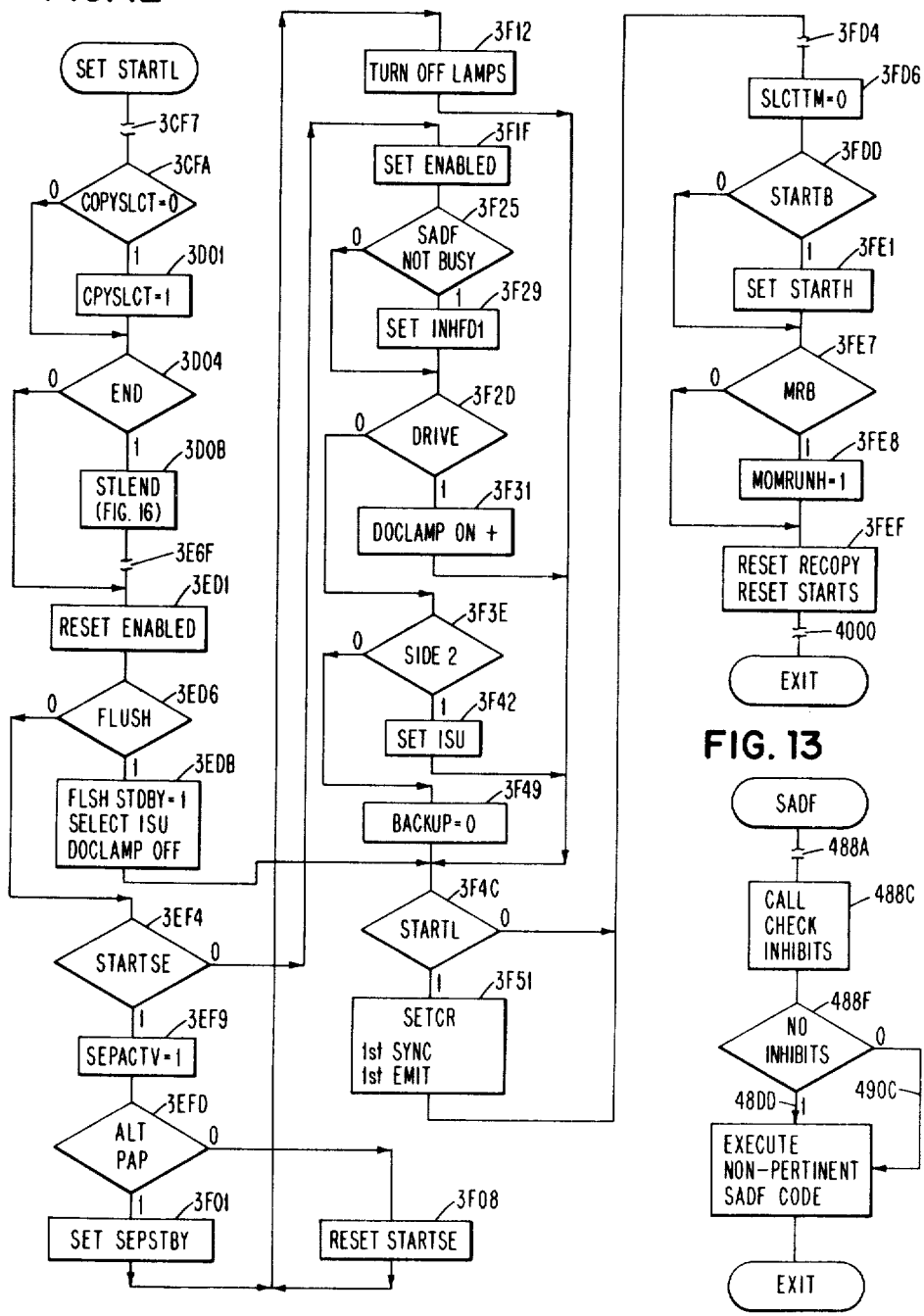

PROGRAMMED COPIER CONTROL

DESCRIPTION

Document Incorporated by Reference

U.S. Pat. No. 4,086,658 shows a programmable control usable in connection with practicing the present invention.

BACKGROUND OF THE INVENTION

The present invention relates to copy production machines particularly of the xerographic type, but including ink jet reproducers and other forms of image transfer machines.

Copy production machines of all types have been computer controlled for many years. Many of the high performance copy production machines such as the International Business Machines Corporation, Model 3800, xerographic printer include program control following classical process control techniques. These techniques are not always applicable for maximum efficiency in lower performance copy production machines. That is, it is desired to reduce the cost of programming such that the total cost of the copy production machine can be minimized.

SUMMARY OF THE INVENTION

It is an object of the invention to provide easily changeable, low cost control programs for a copy production machine.

A copy production machine operating in a series of machine cycles includes cycle indicating means. It has operator control means and machine state indicating means. In accordance with the invention, the machine is characterized in that a first (asynchronous) set of program criteria in the computer memory is accessed and executed by a program control in response to predetermined timeouts whereby the programmable control monitors operation of an initial input to the copy production machine. A second (synchronous) set of programs is executed by the programmed controller in response to the cycle indicating means. The execution of the two sets of programs is substantially independent. Communication between the execution of the programs is provided through memory registers.

The foregoing and other features and advantages of the invention will be apparent from the following more particular description of preferred embodiments of the invention, as illustrated in the accompanying drawings.

BRIEF DESCRIPTION OF THE DRAWING

FIGS. 12 and 13 are examples of asynchronous programs for the FIG. 1 illustrated machine relating to start-up operations.

DETAILED DESCRIPTION

Figure 1:
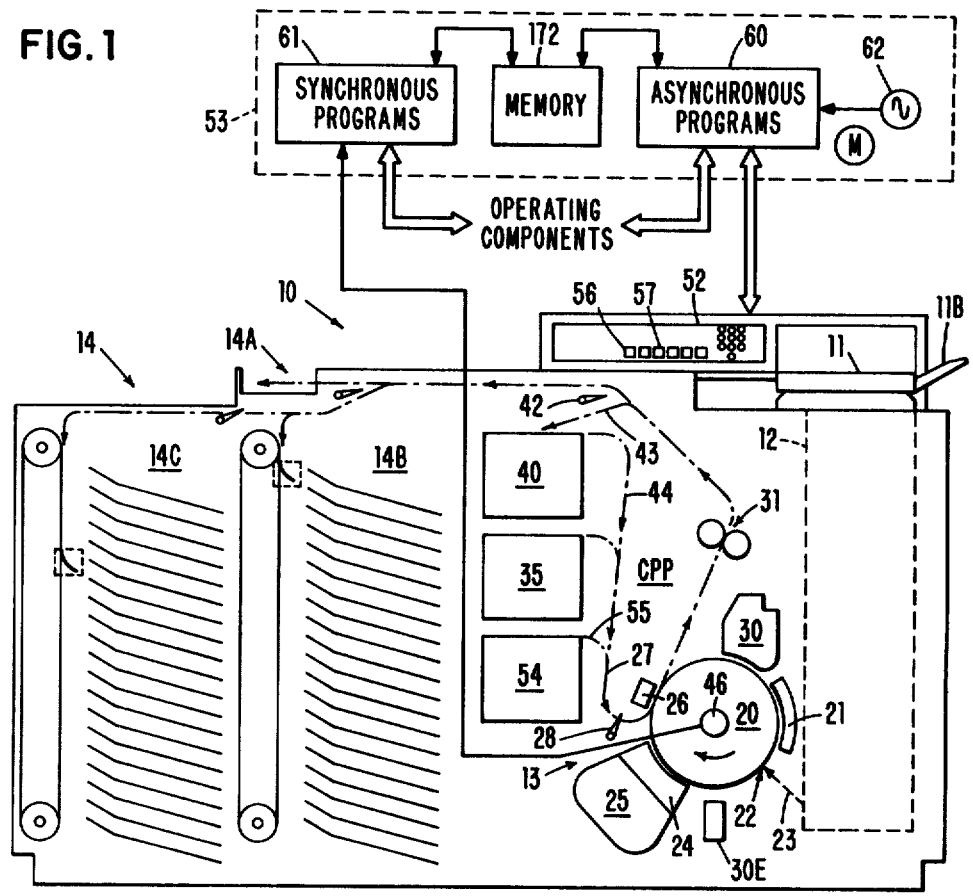
FIG. 1 is a diagrammatic showing of a copy production machine employing the present invention.

In the drawings, like numerals indicate like parts and structural features. A copy production machine 10 (FIG. 1) employing a first version of the present invention includes a semiautomatic document feed (SADF) 11 for feeding manually inserted original documents to be copied. The document glass (not shown) in SADF 11 is scanned by known optical scanners in original input optics 12 to provide an illuminated image over path 23 to a later described copy production portion (CPP) 13. Copy production portion 13 transfers the line 23 indicated optical inmage to a copy sheet as will be later described, and supplies the produced copies to output portion 14 for pick up by an operator or for automatic transfer to other utilization apparatus (not shown). In a constructed version of the invention, output portion 14 includes a copy output tray 14A which receives all produced copies in a noncollate mode. When the copy production machine 10 is to be used in an environment requiring automatic collation, a collator 14B is included in output portion 14. When the number of copies to be collated becomes relatively large, a second collator 14C is connected to the first collator 14B in tandem for receiving copies to be collated.

To illustrate the present invention, programmed control means are provided in the copy production machine 10 for automatically inserting copy separation sheets from copy production portion 13 and inserting same between copies of successive jobs in output portion 14. This action includes selectively supplying copy separation sheets to copy exit tray 14A and to a selected number of copy receiving bins in collators 14B, 14C. In the latter regard, if ten copies are being made of each image, then ten separation sheets are provided to collator 14B. Similarly, if fifteen copies are being made, then fifteen copy separation sheets are supplied. If it is desired to have a plurality of copy separation sheets between two successive copy jobs, then the copy production portion 13 is actuated to supply some plurality of copy separation sheets in the manner described for the single copy separation sheet per copy bin. Furthermore, if more copies are to be produced than there are collator bins, then programmed control 53 keeps a tally of copies produced for a given copy production job. Another application of the invention is described with respect to automatic copy jam recovery. From these two examples, it can be seen how all functions of a copy production machine can be effectively controlled by practicing the present invention.

The copy production machine 10 includes an operator's control panel 52 having a plurality of manually actuable switches for introducing copy production parameters to copy production portion 13 and a plurality of visual indicators. Such parameters are well known and are not detailed except for those parameters arbitrarily having an operative and direct relationship with the illustrated embodiments of the present invention.

The operation of the copy production portion (CPP) 13 is described in incorporated U.S. Pat. No. 4,086,658, col. 3, line 58 through col. 5, line 36.

Figure 2:
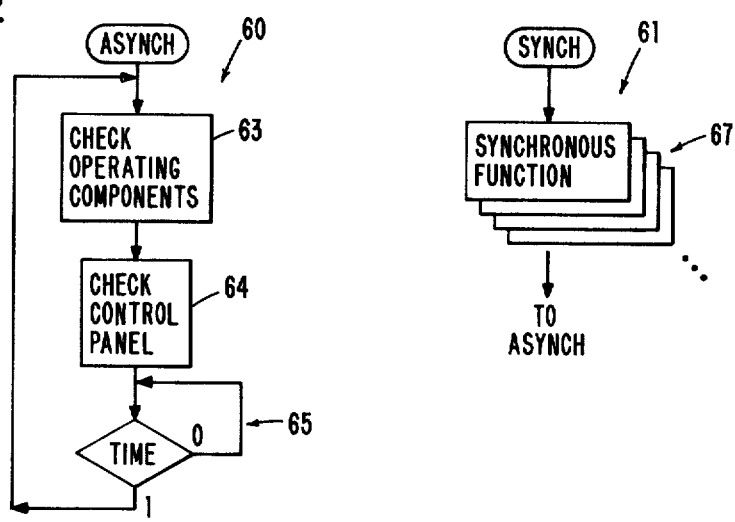
FIG. 2 is a simplified diagram illustrating the principles of the present invention.

In to FIG. 2, the general principles of the invention are diagrammatically illustrated. The computer programs in the programmed control are divided into two major groups—asynchronous (with respect to the copy process) program 60 and the synchronous program 61. Such programs can be executed in the manner described in the above incorporated commonly assigned Finlay patent.

The asynchronous programs 60 are executed preferably at a periodic rate, for example, at each zero crossing of the power line frequency. In the United States this would mean 120 times a second, no limitation to this actuation is intended. In FIG. 1, periodic signal generator 62 represents the connection to the power line which detects the zero cross-overs for actuating the computer described in the incorporated patent to execute asynchronous programs. In asynchronous programs 60, a first subset of programs checks the operating components in step 63. This checking includes sensing copy sheet path jam detecting switches (not shown) for possible copy sheet jams, fuser 31 temperature, whether any copy sheets are in supplies 40, 35 or 54, operation of optics 12, operation of SADF 11, and the like. A second program portion 64 of the asynchronous programs checks the control panel 52. That is, it will sense all of the switches 56 and verify that all of the indicators are correctly illuminated. At step 65, the referenced computer waits for the occurrence of the periodic event indicated by generator 62.

A certain portion of the copy production machine has critical timing and is, therefore, performed in a synchronous manner with the rotation of photoconductor drum 20. This type of synchronous action includes the operation of the copy sheet transport path, respectively indicated by numerals 44, 27, 43, and the associated components. Also the xerographic components such as items 30E, 25 and 24 are similarly controlled. Optics 12 which scans the document in SADF 11 also operates synchronously with photoconductor drum 20 such that the image is placed on the photoconductor area 22 at a precise time. All of the synchronous functions are collectively represented by numeral 67. With other types of machines such as ink jet and other forms of image transfer recording, other synchronous functions can be easily envisioned.

The synchronous programs 61 are timed to the rotation of photoconductor drum 20 via emitter wheel 46. Emitter wheel 46 has a plurality of marks indicating rotational position of photoconductor drum 20. As each mark is sensed going past a predetermined sensor (not shown), such as an optical sensor, Hall effect device or the like, a pulse is sent to programmed control 53. This pulse is interpreted as an interrupt for interrupting the programmed control 53 to service the desired synchronous function 67 to be performed. Such interruption of programmed computers is well known and is not described for that reason. Furthermore, the architecture shown in the above referenced programmed computer illustrates how such pulses are interpreted.

The operating components of the copy production machine 10 are all illustrated in diagrammatic form in FIG. 1. All of these components provide inputs to and receive outputs from programmed control 53 via execution of the synchronous programs 61 and asynchronous programs 60. All of this action will become apparent from the continued reading of the specification.

The programmed control 53 must also provide for intercommunication between the asynchronous programs 60 and the synchronous program 61. This is achieved through recording signals in registers within a memory 172 as will become apparent.

Figure 3:
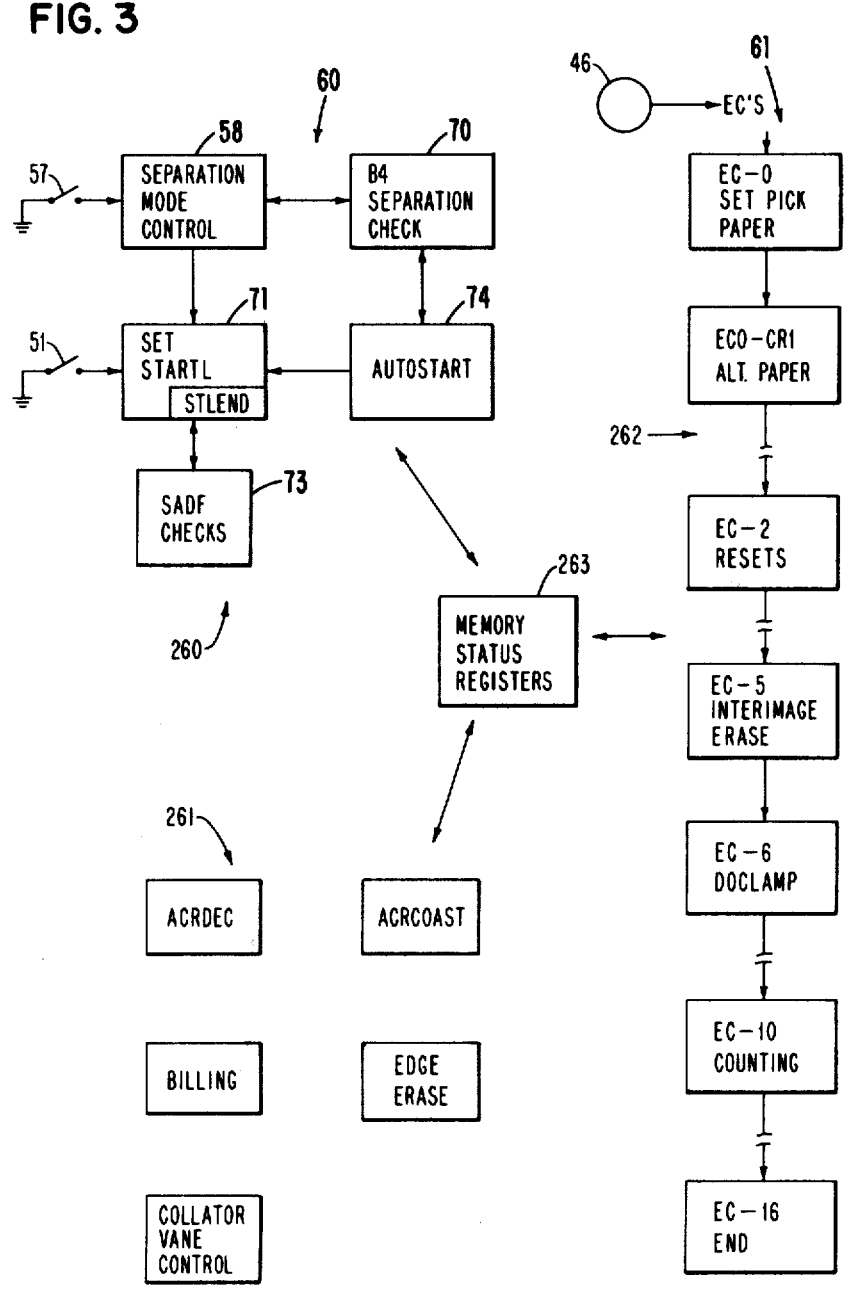
FIG. 3 is a second level logic diagram showing program organization following the teachings of FIG. 2 and applied to a separation mode of a copy production machine.

FIG. 3 is a simplified diagrammatic showing of the various control 53 programs used for a separation mode embodiment. In accordance with the invention, the programs are divided into two categories, asynchronous 60 and synchronous 61. This division eliminates the need for a master control program or an executive program as is usually required in the data processing and machine controller arts. In contrast to that type of control, the program control of the present invention is slaved to the timing and operation of copy production machine 10 such that the electromechanical portions of copy production machine 10 synchronize the operation of programmed control 53. In particular, power line zero crossovers are detected by generator 62 and are used to invoke the asynchronous programs indicated generally by numerals 260 and 261. Even when copies are being actively produced, the asynchronous programs 260, 261 are executed on a power line frequency periodic basis for monitoring the operation of copy production machine 10, including operator control panel 52. It is to be understood that there are many more programs resident for the asynchronous programs, FIG. 3 being limited to those computer programs having direct bearing for illustrating the separation mode.

The second set of programs, termed synchronous programs 61, is timed and instigated by timing signals from emitter wheel 46 of photoconductor drum 20. For each image area, emitter wheel 46 emits periodic pulses called emitter control pulses ECs 0–16. The photoconductor drum 20 preferably has two image areas; hence, there will be two sets of EC0–EC16 pulses for each drum 20 rotation. Programmed control 53 receives and counts the ECs. A fiducial pulse (not shown), also termed a "sync" pulse, defines the image areas on the photoconductor drum 20. Programmed control 53 executes programs (not shown or described) to reset the EC count upon the receipt of each such fiducial pulse. Then for each image area being processed by CPP 13, programmed control 53 responds to its own counting to invoke one of the synchronous programs 61 to be executed. For example, because EC0 relates to a preparatory portion of each image cycle, when EC0 is received, a plurality of programs is invoked. Some of the EC0 programs are not shown for purposes of brevity. At EC2 certain resets are employed in connection with practicing the separation mode. At EC5 the inter image erase controls are illustrated, and EC6 controls a document exposure lamp (not shown) in optics 12. Then at EC10, certain counts are effected for controlling the copy production machine 10. Finally, the last EC, EC16, resets the separation mode upon the end of a separation mode run, as well as performing other functions not pertinent thereto.

Communication between the synchronous programs, the EC0–EC16 programs, and the asynchronous programs 260, 261 are via the memory status registers 263 in memory 172. That is, when a separate switch 57 (on panel 52) is closed, separate mode control program 58 enables programmed control 53 to sense the closure and to memorize the closure in a given location of the memory status registers 263. The programmed control 53 then invokes the B4 separation check program 70 to ensure compatibility of separation sheets with copy sheets. Then, closure of the start switch 51 (on panel 52) is sensed by executing SET STARTL (start latch) program 71. In connection with starting copy production machine 10, SADF 11 is checked at 73 for an original document at a preentry station 11B. Finally, if the copy production had been interrupted or the separation mode had been interrupted, the autostart program 74 enables the computer to automatically restart copy production machine 10 automatically.

As will become apparent, the illustrated asynchronous programs 60 enable programmed control 53 to logically extend the capability of the collator 14B, 14C by allowing more than one collated set per collator bin. Furthermore, other functions are performed by programmed control 53 in response to these stored programs for maximizing the efficiency of copy production machine 10.

Figure 4:
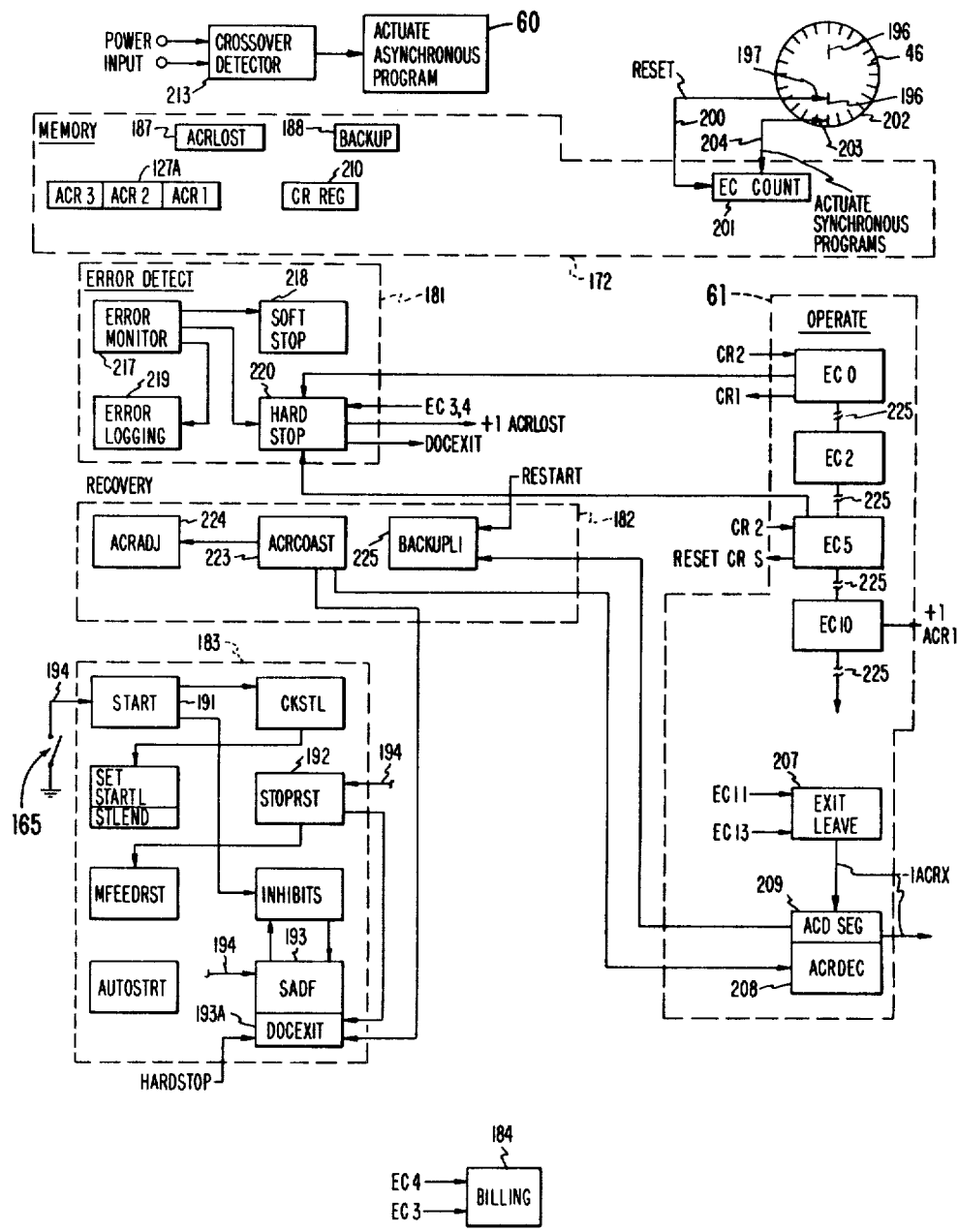
FIG. 4 is a diagram similar to FIG. 3 for showing automatic jam recovery as applied to copy production machines.

In a manner similar to the separation mode, the programs for automatic jam (copy) recovery enable the programmed control 53 to interact with machine 10 components in an efficient and simple way. The response for programmed control 53 to the stored programs for automatic copy recovery is set forth in FIG. 4. The description of FIG. 4 assumes that any initializing POR (Power On Reset) operation has been completed. The machine 10 is now waiting for action to occur. Asynchronous programs 60 enable programmed control 53 to sense panel 52 switches repeatedly for operator requests. Actuation of start switch 51 causes programmed control 53 to execute start program 191, stop reset program 192, the SADF program 193, all as indicated by the truncated lines 194. Start program 191 senses start switch 51 for detecting whether a manually actuated copy production run is to be performed, i.e., the operator places the original document on the platen (not shown) of SADF 11. Similarly, the SADF program 193 senses preentry switch adjacent preentry station 11B in SADF 11 for determining whether a copy production request is being made by placing an original document in the preentry position of SADF tray 11A. Stop reset program 192 enables programmed control 53 to sense for actuation of a stop button (not shown) which is used by the operator to stop all copy production as well as cancelling the effect of the actuation of the start button 51.

Once the copy production machine 10 is started, the two groups of computer programs 60, 61 are used by programmed control 53 to control copy production machine 10. The synchronous programs 60 are timed by emitter wheel 46. Sensor 197 sends its sensed "sync" or fiducial signal over line 200 to an input register (not shown) of programmed control 53 which responds to this signal as an interrupt signal to clear a memory 172 register 201 which contains the EC (emitter count) value. Additionally, emitter wheel 46 has a plurality of emitter marks collectively designated 202, which are sensed by sensor 203 to supply emitter pulses over line 204 to an input register (not shown) and are also used as interrupt signals. Programmed control 53 responds to the line 204 signal to increment the count in register 201. Such interrupts and counting are well known and are not further described for that reason.

The count in register 201 signifies the progression of copy production in CPP 13 during each image transfer or copy production cycle. The programmed control 53 responds to the interrupt signal on line 204 and to the count in register 201 to invoke one of a plurality of synchronously operated programs EC0–EC16 for operating CPP 13 as well as other synchronous portions of machine 10. Not all of the synchronous programs are pertinent to automatic copy recovery and, therefore, are not further described. In addition, these synchronous programs 60 synchronously invoke other programs of interest, such as the exit leave program 207. Programmed control 53 responds to exit leave 207 to check the position of completed copies leaving the aforedescribed copy path. Furthermore, control 53 execution of exit leave program 207 calls the ACRDEC program 208 which decrements the count in ACR register 127A in memory or working store 172. Register 127A contains a count of the number of copy sheets in the path of machine 10 and maintains, up-down counts. for tracking images, the up-down count is divided into three portions, ACR 1-3 ACRDEC 208 includes an ACDSEG program 209. Incrementing the up-down count in ACR register 127A is achieved through an EC10 program when copy sheet should have been picked by CPP 13. The physical status of the copy sheets in the illustrated copy paths is indicated by a bit pattern in CR register 210 using one bit per copy sheet in the machine 10 transport paths. The asynchronous programs 60 are activated in programmed control 53 by zero crossover detector 62 which detects the zero crossovers of the AC power signal. Its output signal is supplied to an input register (not shown) as an interrupt to cause programmed control to scan asynchronous programs 60 for execution. For copy recovery, these programs 60 include the error programs 181, recovery programs 182, and the startup programs 183. The asynchronous programs 60 also include programs (not shown) with respect to the collators 14B, 14C. In this regard, the ACRDEC program 208 enables programmed control 53 to work closely with the synchronous programs 61 but is also used asynchronously via the recovery programs 182 as will become apparent.

The error detect programs 181 (a part of programs 63 of FIG. 2) include error monitor program 217, a soft stop program 218, error logging program 219, and a hard stop program 220. Error logging program 219 is useful for diagnostic and analysis purposes beyond the scope of the present description.

Recovery programs 182 are instituted after the photoconductor drum 20 has coasted to a stop. This stop is determined by a timing procedure in a computer program (not shown or described). Crossover detector 62 supplies its signal for actuating the asynchronous programs 60, which causes ACRCOAST program 223 to be executed. Execution of ACRCOAST performs most recovery functions. It, in turn, calls the ACRADJ program 224 for making the arithmetic adjustments facilitating copy recovery. Also ACRCOAST 223, in turn, calls ACRDEC 208 for completing the recovery calculations. ACRDEC then calls program BACKUPLI which illuminates an appropriate copy recovery indicator of panel 52. During the copy recovery operation, which requires operator interaction, as described with respect to FIG. 3 includes repositioning the original documents or actuating the start button 51. Billing is inhibited as will be described with respect to the billing program 184.

The detailed description of the copy production machine 10 functions controlled by programmed control 53 responding to the various programs in a ROS control store of the referenced U.S. patent are described beginning with an assumption that copies are being produced in a normal manner. First a description of the connections between programmed control 53 and the machine 10 operating components (such as CPP 13) and panel 52 are described. Then the monitoring of the operations of copy production machine 10 by a processor equivalent to the copy microprocessor 170 in the Finlay patent, supra, via programs 60 is described, i.e., the first of the several asynchronous programs 60, then some synchronous programs 61 are described followed by more description of asynchronous programs 60 executed as machine 10 is stopping or has stopped.

Figure 9:
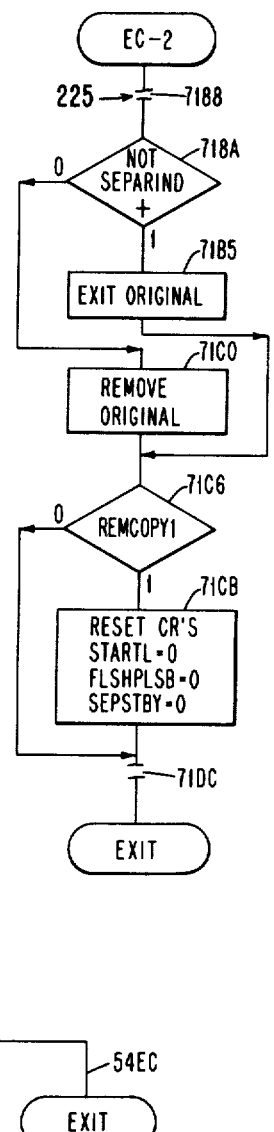
FIGS. 7, 8, 9, 10 and 11 are all instruction level flowcharts illustrating various synchronous programs usable with the FIG. 1 illustrated machine.

It is to be appreciated that the illustrations of the programmed control 53 are greatly reduced for brevity. The functions of programmed control 53 with respect to other functions of machine 10, not described, can be implemented in a manner as indicated for separation and jam recovery. Much of the code procedure is deleted for the purposes of brevity and clarity, such omissions being indicated by the microcode deletion indicators 225 (FIG. 9, for example). The copy register CR 210 has eight bits for indicating status of copy sheets within the copy sheet transport path 29, et seq. Additional machine state indicators may be employed for assisting programmed control 53 in controlling copy production machine 10. The bits of register CR 210 are numbered CR 1-8. CR1, when a binary one, indicates that a copy sheet is to be picked from either ISU 40 or supplies 35 or 35A. CR2 being a one generally indicates a copy sheet is in path 27. CR3 being a one indicates that a copy sheet is in the vicinity of paper path 29. CR4 being a one indicates that a copy sheet is leaving fuser 31 adjacent copy path 33. CR5 being a one indicates that a copy sheet is entering path 34 or ISU 40. CR6-8 are associated with copy sheet transport in collators 14B, 14C. If all bits CR2-CR8 are active, i.e., binary ones, seven copy sheets are simultaneously in the copy paths 27-34. As a copy sheet leaves a portion of the copy sheet path, the corresponding CR bit is reset to zero. As the copy sheets proceed down the path, higher numbered CR bits are set to one while the lower numbered CR bits are reset to zero.

Figure 5:
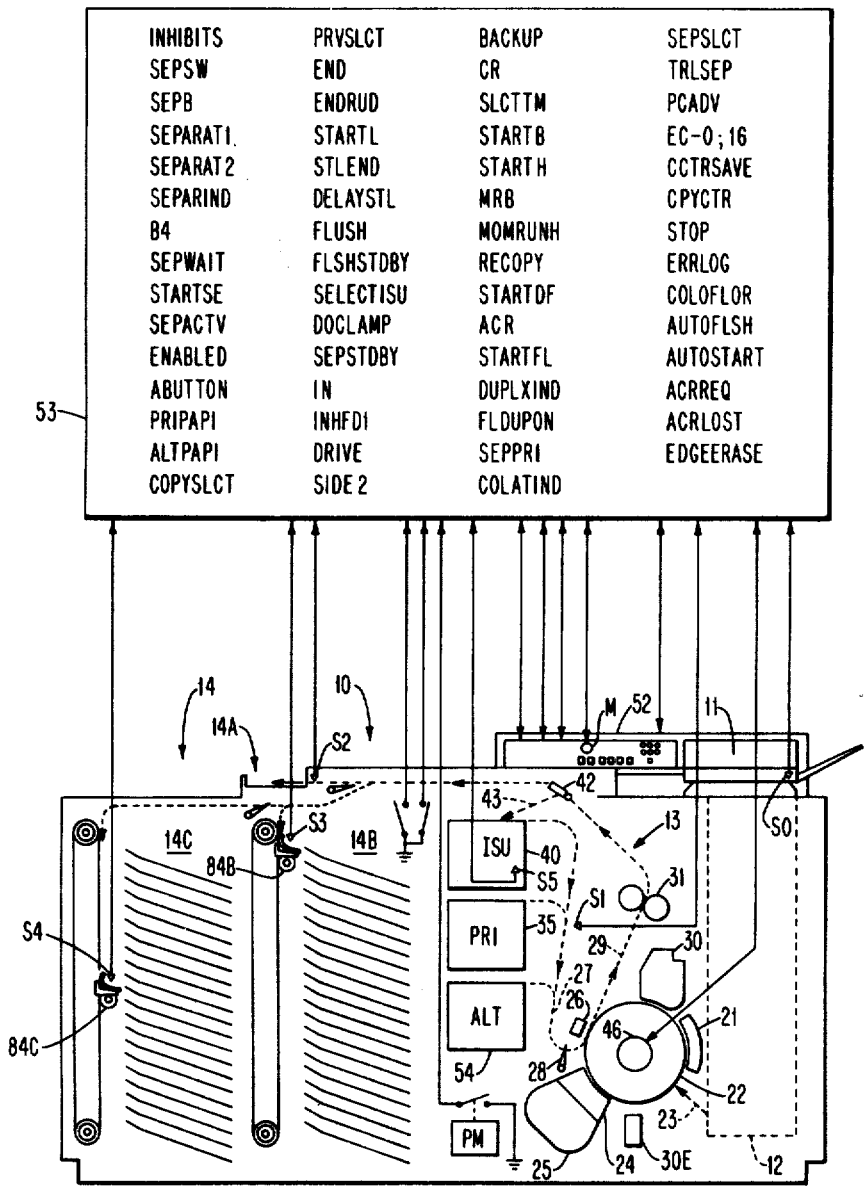
FIG. 5 is an illustration of the relationship of a copy production machine to a programmed controller.

In FIG. 5, programmed control 53 is shown as a box containing a plurality of indicators (bits in memory 172, often termed flags) which are used, as will become apparent, in the program control. The program control operates as the control shown in the referenced U.S. patent. The tables in the Appendix, available for information in the application file in U.S. Patent and Trademark Office, contain selected source code operable on the described control and the FIG. 11 indicators to illustrate the invention when used for separation control.

In to FIG. 5, it is seen that copy production machine 10 is constructed as shown in FIG. 1. In addition, sensing switches S2, S3, S4 are shown at exit positions of output portion 14. Such sensing switches indicate a copy is leaving the copy production machine at its designated output port (termed a billing port) and is suitable to be billed or not to be billed, depending upon the status of copy production, i.e., whether copies are actually being produced or an auxiliary mode such as flush (an automatic emptying of ISU 40) or separate runs are being performed. Switch S1, adjacent copy path 27, senses copy sheets entering CPP 13. It should be noted that FIG. 5 is diagrammatic in that the position of S1 and of alternate paper supply 54 appear to coincide; however, the copy sheets selected from supply 54 actually proceed past S1 before reaching aligner gate 28. The status indicators listed in FIG. 5 are described in the ensuing discussion. A pluggable billing meter PM may be installed in machine 10. It has a switch which signals to programmed control 53 the fact the PM meter is plugged in, allowing the machine to operate. If the PM meter is removed, machine 10 cannot operate. The other lines indicate the large number of electrical connections between programmed control and the operating components for enabling the machine 10 to be controlled in a suitable manner.

Figure 6:
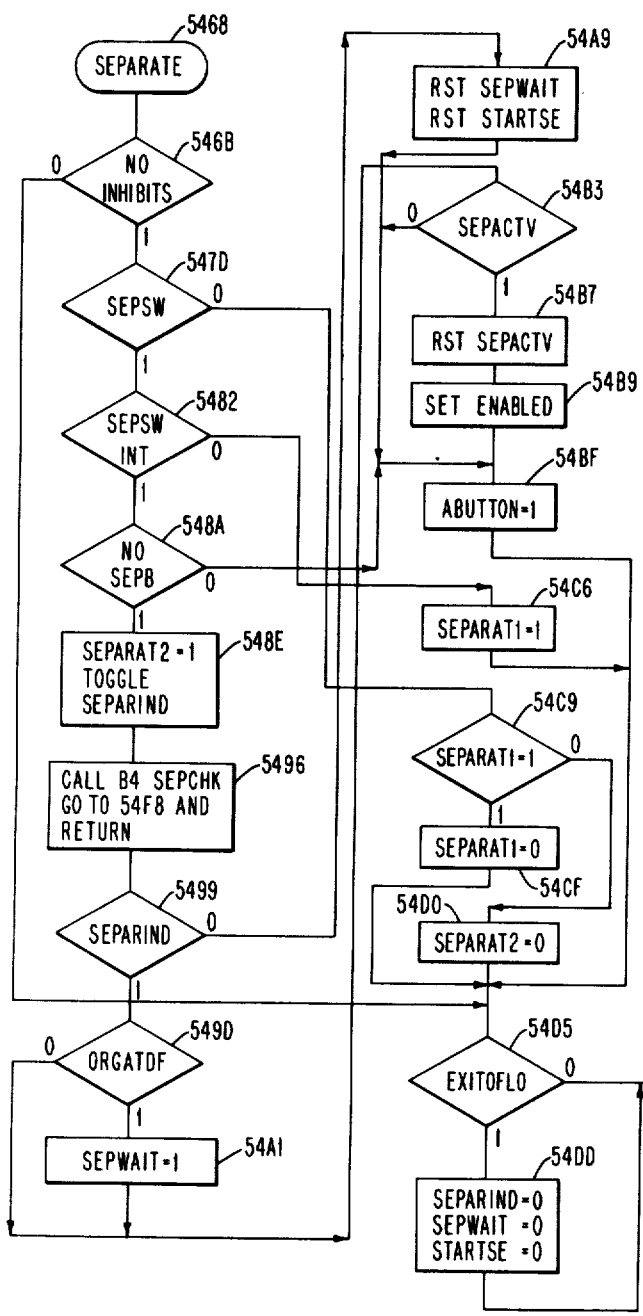
FIG. 6 is an instruction level flowchart of a separate asynchronous program for the FIG. 1 illustrated machine.

In FIG. 6, the separate mode program controls are entered at 5468 (a memory location indicating where the instruction word for programmed control 53 can be found and identifies the location in the source code contained in the Appendix). First, programmed control 53 checks for inhibits at 546B, such as check paper path (CPPIND) and the like. If any Table I (see Appendix) listed inhibits are present, the separation mode should not be performed.

With no such inhibits, at 547D, control 53 checks whether the separation switch 57 (SEPSW) has been actuated. If so, the computer checks whether a switch closure integration (software type) indicates actuation is a true actuation or noise. Then at 548A, control 53 checks to see whether the separate switch or button 57 had been previously successfully integrated. If not, then at 548E separate indicator SEPARIND is toggled to its opposite signal state and SEPARAT2 flag is set to a 1. SEPARIND is one bit of memory 172 and is listed in FIG. 5. Then at 5496 control 53 calls the B4 separation check code (not shown). This code verifies paper size compatibility. At 5499 control 53 checks the separate indicator. If the separate indicator is off, i.e., the toggling of the separate switch deselected the separate indicator, then control 53 at 54A9 resets the separate wait flag and resets the start separate flag STARTSE. If the separate indicator was on at step 5499, the control 53 checks at 549D whether or not an original is at the document feed 11 (ORAGTDF). If there is an original at the document feed 11, then the separate run must wait until after the copy production run for such original document, i.e., one more copy run. The operator, by putting originals in SADF 11, inhibits the separation mode until the end of a set to be collated or produced. In any event, an original at the document feed 11 causes the separate wait (SEPWAIT) flag or indicator to be set at step 54A1. SEPWAIT inhibits the separation mode. From 54A1, control 53 steps the program to 54B3 to determine whether a separation mode is now active. (SEPACTV). If separation mode is active, then control 53 resets SEPACTV at 54B7 and sets ENABLED at 54B9. The flag enabled in status registers 263 allows control 53 to sense the operator parameter selection switches on control panel 52 and indicates all zeros in the numerical display indicating copies made/copies selected. Finally, at 54BF control 53 senses whether or not any panel 52 button was activated. It should be noted that control 53 branches from several points in the separate control program to 54BF. Next, control 53 at 54D5 checks for exit overflow. Exit overflow means that the number of copies being made exceeds the capacity of collator 14B, 14C and excess copies are being directed to the exit tray 14A. In the preferred embodiment, this action occurs only when collate mode is selected after side 1 of a duplex job has been reproduced. If there is no exit overflow, control 53 exits the program at 54EC to execute the next asynchronous program in the line of executions.

In the event of exit overflow, the instruction at 54DD enables control 53 to reset the separate indicator (no separation is required or desired), separate wait and STARTSE flags. Control 53 then exits at 54EC.

At to 546B, if there are inhibits then the instruction at 54D5 is executed and all of the above described intermediate instructions omitted. If the separation switch 57 is sensed as not being pushed at 547D, then at 54C9 SEPARAT1 is set to a one. This flag indicates that the separate button had been previously pushed and is now being pushed. If the SEPARAT1 is equal to zero, this means that the separate switch has not recently been pushed. Therefore, at 54D0 SEPART2 is equal to zero, i.e., separation mode will not be honored. On the other hand, if SEPARAT1 is equal to a one at 54C9, SEPARAT1 is reset at 54CF with SEPARAT2 equal to a one allowed to stand for enabling separation mode. At 5482 if the separation switch integration is still a zero, then at 54C6 the above-mentioned SEPART 1 is set to one.

With regard to the above description, it should be noted that the program was executed at every power line crossover. Therefore, in setting up the separation mode, asynchronous programs will be executed many times during each set-up. Each pass through the program by control 53 senses the immediate status of the machine for enabling the machine to be set up in the separation mode or for any other operator selected function. The source code for the separate mode control program is set forth in Table I of the Appendix. LOC means memory location, OBJ means object, OP1 is operand 1, OP2 is operand 2. The abbreviations in the source statements are as used in the flowcharts or elsewhere. The symbols are those symbols used for logic except a logical "not" is "  ". The "PSBs" are program status bits not pertinent to an understanding of the invention, and SEP indicates separation mode checkpoint.

The above-described programs illustrate the preparatory steps in the asynchronous programs necessary for starting a separation mode. Up to this point in time, the asynchronous programs have actually been executed several times. As conditions changed during separation mode preparation, different branches of the programs are correspondingly executed.

It should be noted that if a flush of interim storage unit 40 is required, that any separation mode run waits until interim storage unit 40 is empty. When the start button has been pushed, sensed and honored, the photoconductor drum 20 rotates supplying emitter EC pulses from emitter wheel 56 as well as the fiducial or sync pulses. Such pulsing is detected by programmed control 53 such that synchronous programs now are repetitively executed in synchronism with photoconductor drum 20 rotation. It should be remembered that for each rotation of photoconductor drum 20 each of the synchronous programs 262 will be executed twice. As a result of those repetitive executions, the copy production machine 10 is synchronously operated while being simultaneously asynchronously monitored and prepared for operation and stopping by the asynchronous programs 260, 261.

The synchronous programs 262 are executed in priority over (interrupt) the asynchronous programs, i.e., when an EC pulse is received from emitter wheel 56, the respective synchronous program must be executed immediately for ensuring proper operation of copy production machine 10. The control exercised by the control 53 via the synchronous programs 262 is based upon a machine state field CR contained in status registers 263 and the timing pulses EC0-EC16 supplied by emitter wheel 46. In a constructed embodiment of the invention, the CR field contained eight bits, CR1 to CR8 plus some other bits not pertinent to understanding the operation of the synchronous program 262. Generally, the bit positions correspond to general functions performed on the copy sheets through the path. Other functions may be performed in accordance with the bit pattern; however, that is not important for the present discussion. In general, CR1 when active indicates a copy sheet should be picked from either the interim storage unit 40, first paper supply 35, or second paper supply 54. Machine functions indicated by bit CR2 are primarily preparatory steps to image transfer from photoconductor drum 20 to the copy sheet. Included in such preparatory steps are lamp control, magnetic brush checking, SADF 11 control, and the like. The bit positions CR3, CR4 are primarily concerned with image transfer controls such as fuser opening and closing, early exit arrivals, detach of copy sheets from photoconductor drum 20 and the like. CR5 bit indicates certain post image transfer housekeeping chores. Buts CR6, CR7 and CR8 are primarily related to collator controls. The computer of control 53 is programmed to maintain machine status with respect to each copy sheet being transferred through the machine by inserting a binary one in the respective bit positions such that the associated machine functions can be appropriately performed. The meshing of the timing pulses EC0-EC16 with the CR fields follows the same timing control techniques used by prior relay control machines, such as the IBM Copier II manufactured by International Business Machines Corporation, Armonk, New York.

While the above program shows how one asynchronous program enables control 53 to set up one selection in machine 10, other selections are set up in a similar manner; of course, different parameters are used. The response to start switch 51 is handled in a similar manner. The bits in memory 172 set by execution of asynchronous programs are read during execution of the synchronous programs, as will become apparent.

In to the synchronous programs 61, the EC0 programming (FIG. 7) contains some preparatory steps necessary for beginning an image cycle. As expected, many functions are performed during this particular synchronous program including non-pertinent code (not pertinent to separation mode) represented by 6DE9. Furthermore, because of the extremely high speed of program execution, the order of execution of synchronous programs 60 in some instances can be somewhat independent from the order in which the machine actually functions and they are executed several times for many individual functions of machine 10. For brevity and to avoid describing the program execution repetitions, the description will follow program execution rather than machine functions.

At 6E25, control 53 checks to see whether the CR2 bit of CR register 210 is set. If CR2=0, no pertinent action need be taken so the program is exited via the non-pertinent code at 6EBC. If CR2=1, certain pertinent preparatory steps have to be performed. Execution of this synchronous program assumes that a copy sheet has already been picked. After sensing CR2 active, control 53 determines whether preconditioning is occurring at branch instruction 6E29. The term "preconditioning" is defined in Knight et al U.S. Pat. No. 4,036,556. If preconditioning is occurring, then no copy sheets will be transported and the EC0 code can be exited via the non-pertinent code at 6EBC. Otherwise, control 53 at 6E2E increments the copy-counter-save count field to be equal to the numerical contents of the copy counter field plus one. Then at 6E3F, control 53 checks to see whether there is a stop condition or an error condition. If there is, the program is exited via the non-pertinent code at 6EBC. If, one the other hand, the condition of the machine 10 is error-free, then control 53 at 6E53 checks to see whether or not side 2 indicator is active, i.e., whether the next image transfer will be a side 2 of a duplex copy production run. If it is, then control 53 checks at 6E58 to determine whether interim storage unit (ISU) 40 is not empty. If ISU 40 has copies in it, then control 53 checks at 6E5D to see whether separation mode is present in the machine and whether the copy select (CNT) is greater than the collator capacity (COL). If those conditions are satisfied, then the collator overflow flag is set at 6E7A. This results in action that the copies being produced will be produced from the duplex tray (ISU 40) with the excess copies not insertable into the collator being directed to copy output tray 14A. On the other hand, if the condition of branch 6E5D is not true, then bit CR1 is set to a one at 6E7F in preparation for picking a copy sheet from a designated paper supply 35 or 54. On the other hand, if interim storage unit (ISU) 40 is empty as detected at branch instruction 6E58, then the end flag is set at 6E89. Finally, non-pertinent code at 6E98 is executed before performing the branch at 6EA9 for detecting whether or not the copy-counter save-field is less than the copy select field. If is is less, this means copies are yet to be produced and CR1 is set to one at 6EAD. On the other hand, if counter save is not less than copy select, the run is over and end flag is set at 6EB2. The program is exited via the non-pertinent code beginning with 6EBC.

The source code for the above flowchart is set forth in Table II of the Appendix.

Figures 7, 8, 10, 11:
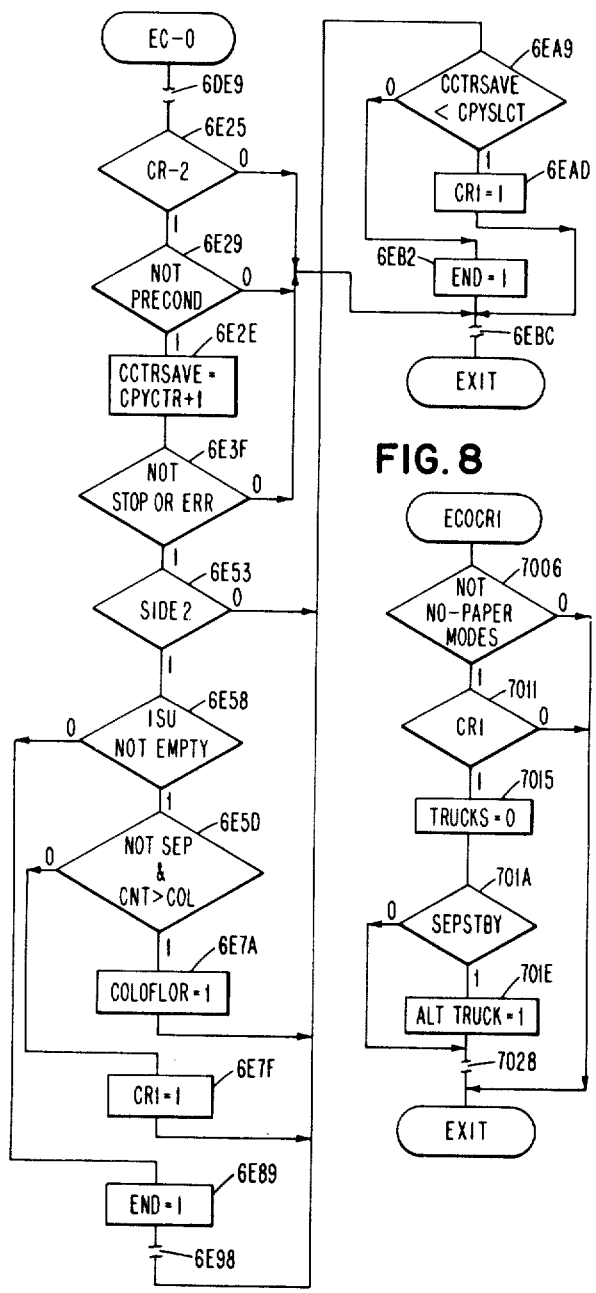

In FIG. 8, the code EC0 CR1 is described. In the sequence of machine preparation for copy production, EC0-CR1 code has an effect before the FIG. 7 illustrated EC0 code, it being understood that several repetitions of code execution occur during each machine preparation. In EC0-CR1, control 53 checks at 7006 whether there are no paper modes, i.e., the machine operation will not require transport of copy sheets from any of the paper supplies. If it is a no-paper mode, there is no need to pick paper; therefore, the entire code element is bypassed. If, on the other hand, a paper mode is indicated, control 53 checks for CR1 of CR register 210 at 7011. If CR1 field bit is not set, there is no need to pick paper, the remaining code can be bypassed. If CR1=1, then the trucks of paper bins 40, 35, 54 are set to zero at 7015. Such trucks are those mechanisms in copy production machine 10 which reach into the paper supply bins for removing a copy sheet for copy production or for separation sheets. Such devices are shown in the IBM TECHNICAL DISCLOSURE BULLETIN, February 1974 on pages 2966 and 2967. With the trucks being reset to an out of supply bin, a no-pick position, control 53 is in a better position to select from which of the supplies to pick a copy sheet.

At 701A, control 53 checks for the separate standby (SEPSTBY) flag (a bit in memory 172). If it is active, it means the separation mode is being performed; then the alternate truck for supply 54 is selected at 701E. Non-pertinent code is executed beginning at 7028 and this synchronous program is exited to other EC0 codes (not shown). The source code is shown in Table III of the Appendix.

The next described synchronous program is the EC2 code shown in FIG. 9 and listed in Table IV of the Appendix. Ignoring the non-pertinent code including code location 7188, control 53 checks via the branch instruction at 718A whether the separate indicator (SEPARIND) is active plus other conditions as seen in Table IV. If the separate indicator is not active and the other conditions are met, the original on the platen of SADF 11 is exited via output instruction 71B5. Otherwise, the remove original light (not shown) on panel 52 is illuminated by the instruction at 71C0. Then at 71C6, the remove copy 1 flag is checked. If it is active, then at 71CB the indicated flags are reset and the CR field 10 is reset to all zeros. Non-pertinent code is executed at 71DC and this synchronous program is exited. The above code illustrates one intimate relationship between the synchronous programs and the asynchronous program control operations of SADF 11 and setting a panel 52 indicator from a synchronous program to minimize bit handling by the control 53.

Control 53 responds to the EC5 code with respect to the separation mode as shown in FIG. 10 and Table V in the Appendix. First CR2 is checked at 7367 to determine whether the inner image erase lamp should be turned off as the image area is just beginning to pass the interimage erase 30E. Branch instruction at 736C checks whether the next operation is not auxiliary to copy production. During auxiliary operations (copies not produced) such as the separation mode, the inner image erase lamp 30E is left on to erase the image area. A flush, separate mode, a preconditioning or other auxiliary functions of a copy production machine require no image transfers. If copy production is to ensue (not auxiliary) then the inner image erase lamp 30E is turned off at 737F to allow an image to be imposed upon the image area of photoconductor drum 20. Non-pertinent code 7386 completes the EC5 code.

Similarly, the EC6 code shown in FIG. 11 and Table VI of the Appendix enables control 53 to control the document lamp. Again, non-pertinent code is omitted at 73E5. The branch at 73E9 checks for CR2 and end, i.e., the last time CR2 will be used in the particular copy production run. If so, then at 73F2, control 53 checks for separation mode (SEPSTBY) and a delayed start, i.e., a leading separation mode run which is a separation mode run followed by copy production run. If so, then the document lamp is turned on at 73FA. Otherwise, non-pertinent code at 7402 is executed.

How the computer sets start latch (STARTL) is flow charted in FIG. 12 with the source code being shown in Table VII of the Appendix of this asynchronous program selected by start switch 51. The program is invoked in response to the actuation of the start button 51 on panel 52 or the insertion of an original document into SADF 11. It is to be understood that before a start latch in a copy production machine is activated, several things must be performed and achieved that are not pertinent to the separation mode. For example, non-pertinent code is included at diverse memory locations, such as at 3CF7, 3E6F, 3FD4 and 4000. As to the pertinent code, the computer checks at 3CFA whether the copy selection is equal to zero. If it is zero, then the minimum run for copy production should be unity;

therefore, control 53 sets the copy select to one at 3D01. The end flag (signal stored in memory or store 172), i.e., signifying the end of a copy producing run, is checked at 3D04. This indicates whether a normal end was achieved by the previous run. If so, a program STLEND (not in a drawing), identified as 3D0B, is executed.

Before permitting copy production to ensue, control 53 resets the enable flag at 3ED1. The enable flag being reset tells control 53 not to honor any selections from panel 52, the sole exception being the stop button for stopping copy production machine 10. Then, control 53 checks for previous status at 3ED6, i.e., whether the flush flag is on. If the flush flag (bit in memory 172) is on, this means copies in ISU 40 must be transported to the output portion 14 without receiving any images. If this flag is active, then control 53 at 3EDB sets the flush standby flag to unity, selects ISU 40 as the source of copy sheets for being transported to output portion 14 and turns the document lamp (not shown) off. The document lamp (not shown) scans the original document on the platen (not shown) of SADF 11 for transferring an optical image to photoconductor drum 20. After this step, control 53 proceeds to sense at 3F4C whether the start latch is active. If the start latch is already set, then at 3F51 control 53 sets the copy register CR 210 within memory 172 and looks for a first so-called sync and a first emit pulse from emitter wheel 46. The status of the CR register 210 is not pertinent to the operation of the separation mode but is important in copy production. Since machine state registers are well known, further discussion is dispensed with.

After the above steps and executing non-pertinent code at 3FD4, control 53 sets the button select time indicator SLCTTM to zero, i.e., the time is reset such that a button depression timeout can be initiated. Then at 3FDD the start button 51 is sensed to whether it is active. If so, the STARTH flag in memory 172 is set at 3FE1. Then the momentary run button MRB is sensed at 3FE7 (MRB is not shown in the drawing). If MRB is active, then the memory 172 flag MOMRUNH is set indicating that the momentary run button has been actuated. Then at 3FEF, control 53 resets all the panel 52 recopy lights (not shown) which indicate to the operator the number of documents to be recopied for error recovery and then resets the latch STARTS in memory 172. The various start latches are "program flags" for synchronizing the startup procedure and each occupies one bit position (latch) in a register within memory 172. The control 53 exits the program via the non-pertinent code at 4000.

At 3ED6, if no flush (empty ISU 40) operation is to be performed, then the instruction at 3EF4 determines whether a separation mode is to be started (STARTSE). If not, the instruction 3F1F sets the enable flag for allowing the operator to insert operator parameters via panel 52. Then at 3F25, control 53 checks whether SADF 11 is busy. If it is not busy, then the flag INHFD1 is set at 3F29. INHFD1 indicates that an operator has lifted the lid (not shown) of SADF 11 and can manually place an original to be copied on the platen (not shown) of SADF 11, i.e., the SADF 11 is not used for transporting an original document in the ensuing copy production run. Otherwise, the SADF is being used. In either case, the status of the main drive motor (not shown) for machine 10 is sensed at 3F2D. If the motor has been turned on, then the document lamp (not shown) is turned on at 3F31 for scanning the original document which is in copying position within SADF 11, whether manually inserted or semiautomatically inserted.

If the drive is still off at 3F2D, then control 53 checks for a side 2 indicator at 3F3E. If the side 2 is to be produced, i.e., ISU 40 is to be the source of the copy sheets for duplex copy production, then control 53 at 3F42 selects ISU 40 as a source of copy sheets. If it is not side 2, then it must be side 1. The copies to be produced in an ensuing copy production run will either be the first portion of a simplex run or be directed to the interim storage unit 40 as partially completed duplex copies. In either event, the backup register 188 of memory 172 is reset to all zeros at 3F49 for indicating that the original document in SADF 11 to be scanned by the document lamp turned on at 3F31 is the first image in a possible series of images being copied. From 3F49, control 53 executes the code beginning at 3F4C as previously described.

When separation mode flag indicates a separation run is to be performed, then at 3EF9, control 53 sets SEPACTV to "1" for indicating separation mode is active. Control 53 then checks at 3EFD to determine whether the alternate paper supply 54 has been selected. If it has already been selected, then separation standby flag SEPSDBY is set at 3F01. On the other hand, if the alternate paper has not yet been selected, STARTSE is reset at 3F08 requiring the alternate paper supply 54 to be selected before the separation mode can ensue. At 3F12, control 53 turns off the document lamp (not shown) since no copy images are to be transferred. Then, control 53 finally reaches 3F4C in the program as above described.

After the start latch (a bit in registers 186) has been set, the FIG. 13 illustrated asynchronous program (source code in Table VII of the Appendix) relating to control of SADF 11 checks for SEPWAIT In the inhibits checked at a routine called by a branch and link at 488C. Such inhibits, in addition to separation wait, include some of the doors of copy production machine 10 being open, a flush occurring, copy recovery in progress, and the like. If SEPWAIT is not active (no inhibit), a branch instruction executed at 488F causes non-pertinent SADF code to be executed beginning either at 48DD; with SEPWAIT=1, non-pertinent SADF code beginning at 490D is executed. This code illustrates the close interaction of all the control programs illustrated for executing separation mode and the effect of status registers 263 in providing communications between asynchronous programs 60 and synchronous programs 60.

The above-described synchronous programs illustrate an operation of copy production machine 10. When the machine 10 stops, either normally at the end of a copy production job or an emergency of abnormal stop due to a copy sheet jam or other malfunction, some asynchronous programs are executed by programmed control 53. This execution by control 53 handles machine status in a manner to facilitate restarting machine 10 as well as monitoring the stopping process. A good illustration is an abnormal stop which invokes execution of ACRCOAST. ACRCOAST is a jam recovery program executed while photoconductor drum 20 is coasting to a stop after detection of a jam condition.

Figure 14:
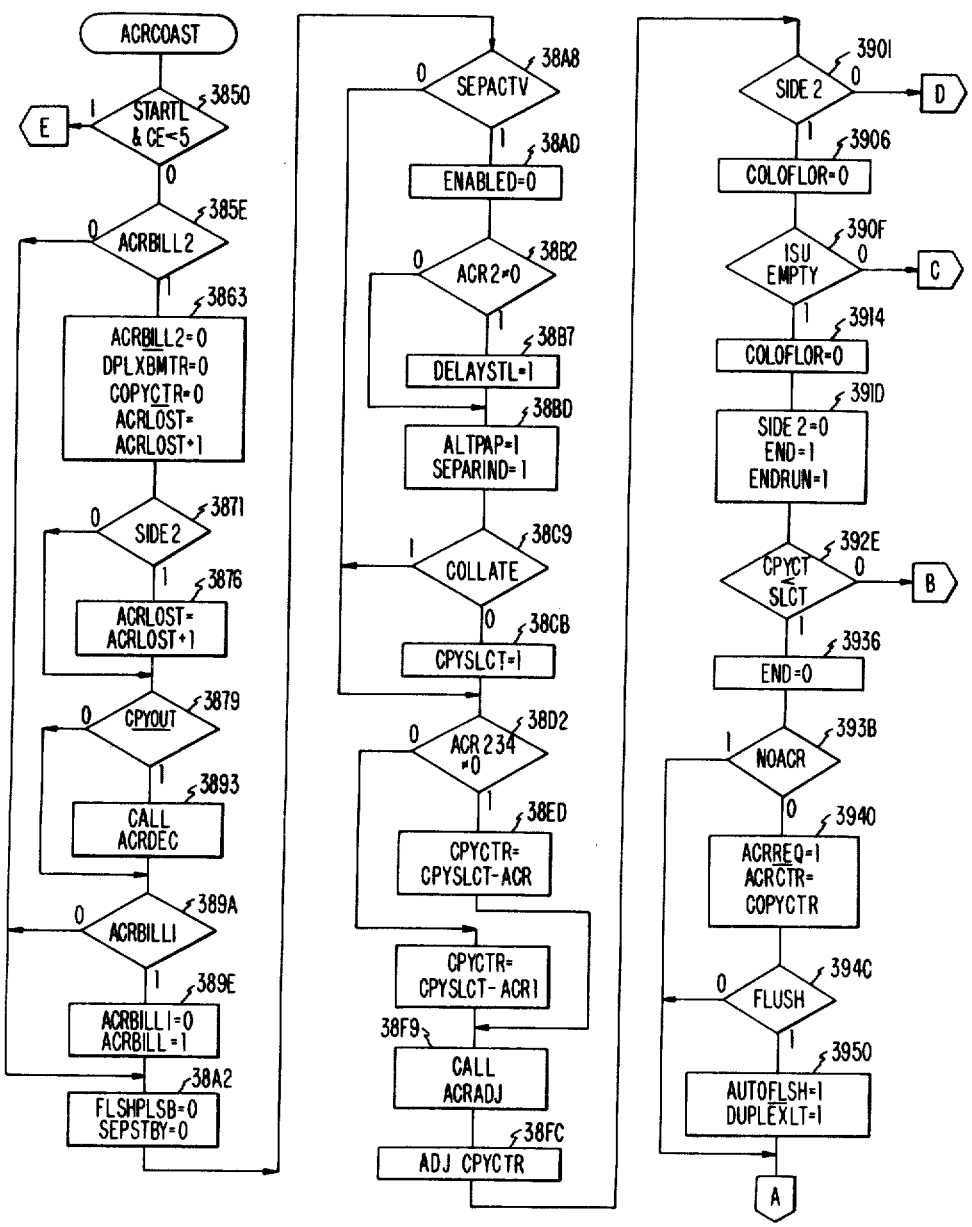
FIGS. 14 and 15 are flowcharts which illustrate an asynchronous program executed upon stopping of the FIG. 1 illustrated machine.
Figure 15:
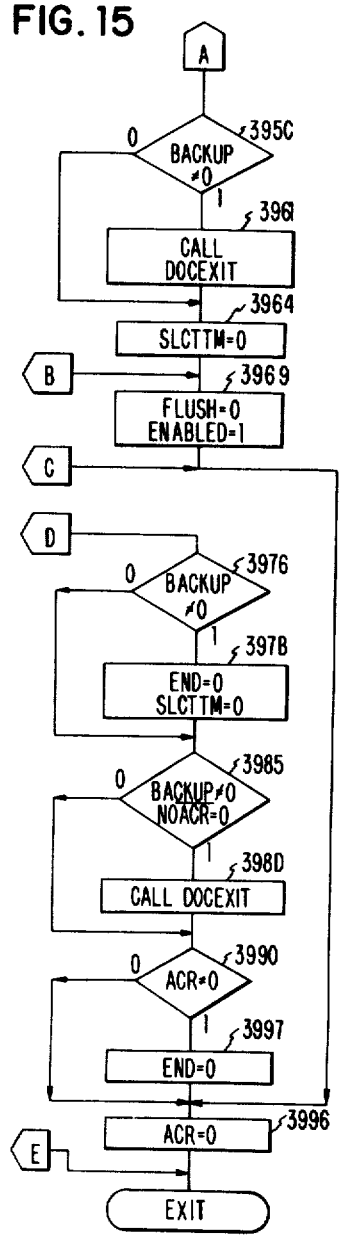

In FIGS. 14 and 15, the instruction level procedure flowchart for ACRCOAST shows programmed control 53 first checking the start latch state (a bit in status registers 186) and whether a CE mode is active at 3850.

If the CE mode is active, the program is exited as indicated by the off page connectors "E" in FIGS. 14 and 15. Otherwise, an ACR bill indicator is checked at 385E. If ACRBILL2 is active, then it is reset at 3863. Other steps in the same box include resetting copy count register 93A to zero and incrementing the ACRLOST register 187 by unity. When the ACRBILL2 is active, it means a copy sheet was under the billing exit switch and, therefore, one more copy sheet has been lost in abnormally stopping machine 10. Then at 3871, control 53 checks the side 2 status indicator. If it is unity, then a duplex copy sheet was under the billing sensing switch (either 105, 110 or 102 depending upon the mode of operation). Therefore, ACRLOST is again incremented for showing that two images on the duplex copy sheet have been lost. Then at 3879, programmed control 53 checks to see whether the billing meter would be operated off the collator vane switch 105 or 110 and the appropriate exit switch was not active, i.e., the copy sheet has already left the machine and is a good copy sheet. If so, the ACR registers 127A should be decremented. Accordingly, ACRDEC 208 (not shown) is called at instruction step 3893. If the copy did not make it out of the machine, the call at 3893 is omitted and programmed control 53 checks for inhibition of billing at 389A. If billing was inhibited, i.e., a copy jam occurred during a recovery procedure, then at 389E ACRBILL1 (inhibit billing) is reset. That is, billing is not inhibited. Also, ACRBILL is set to the active condition for enabling the billing meter M. If the ACRBILL2 was inactive, i.e., a copy sheet was not under the exit switch when machine 10 stopped, then all of these steps are omitted and control 53 at 3882 resets the standby indicator 232 by resetting the indicator flags. Then at 38A8, programmed control 53 checks to see whether the separation mode is active. If not, the following described steps are omitted with the programmed control 53 performing the instruction at 38D2. The intermediate steps for separation mode being active includes resetting the enabled flag at 38AD for disabling the panel 52 multidigit display (not shown). Then at 38B2, the value of ACR2 is checked; if ACR2 is not zero, the copy run has not yet been completed and the delay start latch (a bit in status registers 186) is set to unity at 38B7. This means that there were copies for more than one image in the copy path at the time of stopping copy production machine 10.

The alternate paper selector for selecting copy sheet supply 35A is set to unity at 38BD and the separate indicator is set to unity. This means that the separation mode will occur during copy recovery prior to any copy production. That is, if the copy sheet jam occurs when separation sheets are being supplied, then the ACR enables the copy production machine to recover automatically by automatically supplying the appropriate number of separation sheets. Then, programmed control 53 at 38C9 checks to determine whether the collator is being used. If not, the copy select register 72A is set to unity at 38CB. In non-collate mode, only exit tray 14A is used; therefore, only one separator sheet is supplied. Otherwise, the number of separator sheets will be a number of sheets equal to one of the values of the ACR registers. For example, if the separator sheets were in ACR3, then the number in ACR3 will indicate to copy production machine 10 the number of separation sheets to supply to the collator 14B, 14C for recovery.

Next, programmed control 53 at 38D2 checks to see if any ACR other than ACR1 is not equal to zero, i.e., whether a multiple run was involved in the jam error condition. If so, copy count register 93A should be decremented by the number of copy sheets lost. This is done at 38ED where the copy counter 93A is equal to the copy select register 72A minus the value in ACR 127A. If ACR2, 3 and 4 are equal to zero, then only ACR1 is involved. Then the copy counter register at 93A is made equal to the copy select register 72A minus the value in ACR1. It should be noted that the copy select register 72A at 38ED is equal to the ACRX, i.e., the highest numbered copy non-zero ACR register.

Programmed control 53 joins the two branches of the program procedure at 38F9 by calling ACRADJ 224. ACRADJ (not shown) enables programmed control 53 to adjust the copy counts to accommodate copy sheets lost. The remainder from the ACRADJ subtraction is then stored in the copy count register 93A at instruction step 38FC which merely transfers the contents of an accumulator (not shown) within programmed control 53 to register 93A.

After the adjustment has been made, programmed control 53 checks for the side two indicator at 3901. If side two is active, then at 3906 COLOFLOR (collator overflow request bit in registers 186) is set to zero. At 390F, ISU 40 is checked whether it is empty. If it is empty and the side two indicator is active, then at 3914 and 391D side two indicator is reset, END is set to one, and END RUN is set to one. Since ISU 40 was empty, any side two operation must have been completed. The end of a copy production run is indicated by the END flag and the END RUN flag. Then at 392E, the relative values of the copy select register and the copy count registers, respectively 72A and 93A, are compared. If the copy count is less than the select count, then it cannot be the end of the copy run; then programmed control 53 resets the END flag of 3936.

Then at 393B, programmed control 53 checks to see whether automatic copy recovery is to be suppressed or inhibited as indicated by the NOACR flag of registers 186. If NOACR=0, then at 3940 ACR request is set to unity and the ACR count is set equal to the copy count 93A. Then whether the ISU 40 should be emptied is checked at 394C (flush). If so, automatic flush on restart is set at 3950 and the duplex light (not shown) of panel 52 is illuminated. It should be noted that the duplex light is a combination illumination indicator and a plush button switch. If NOACR=1, then ACR is inhibited.

The remainder of the description of ACRCOAST is made with respect to FIG. 15. From offpage connector "A", instruction step 3950 (FIG. 14), programmed control 53 does the instruction step at 395C to check whether the backup register 188 has a value of zero. If it is not zero, then any document in SADF 11 is excited by calling DOCEXIT program 193A (not detailed) at instruction 3961. The backup count equal to zero means that the image in copy production machine 10 that was lost on the jammed copy sheets are images of an original in SADF 11. Such a single original should be left in SADF 11 to facilitate recovery. Therefore, to recover, all the operator has to do is to push the start button after clearing the machine of the jammed copies.

At 3964 further selections are inhibited by resetting SLCTTM. Instruction step 3969 is entered from offpage connector "B" of FIG. 14 which represents the branch instruction 392E. Programmed control 53 resets the flush flag and enables display of copies selected and copies counted by setting the enable flag. Following the instruction at 3969 (the offpage connector "C" from the FIG. 14) instruction 390F joins the program step path of procedures for resetting ACR to all zeros at 399C before exiting ACRCOAST, i.e., ACR calculations have been completed.

Offpage connector "D" from instruction step 3901 of FIG. 14 enables programmed control 53 to execute branch instruction 3976 for detecting the value stored in backup register 188. If it is nonzero, then the END flag, indicating that the end of the copy production run is imminent, is reset and selection is inhibited by the execution of instruction step 397B. If backup is equal to zero (the zero exit of path 3976), then programmed control 53 at instruction step 3985 checks the combination of backup not zero and NOACR=0 (ACR is permitted). If these conditions are true, then the DOCEXIT program 193A (not detailed) is called by programmed control 53 at 398D. Execution of DOCEXIT ejects an original document from SADF 11. That is, more than one image on the original in SADF has been lost requiring exiting a document (if still there) for recovery. Then at 3990, if the numerical contents in ACR register 127A are nonzero, the END flag is reset at 3997 and instruction 399C is executed.

All of the above actions of ACRCOAST are performed by programmed control 53 as photoconductor drum 20 is coasting or has just coasted to a stop. At this time, the operator must remove the copy sheets from the paper path while the programmed control 53 continues repeating the steps for completing recovery from the jam condition as soon as the operator completes the removal of jammed copy sheets. A review of FIGS. 3, 4 will show some other asynchronous programs executed in recovery 182 as well as controlling the stop (soft stop 218, hardstop 220, etc.).

Figure 16:
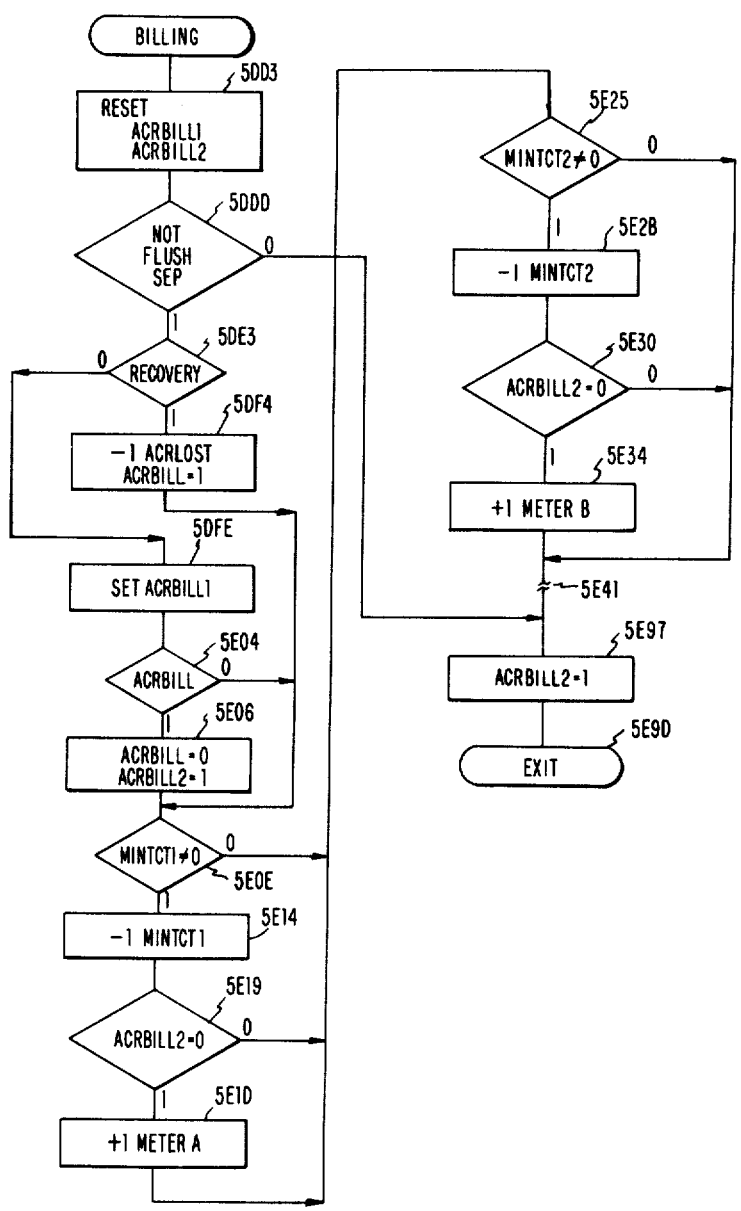
FIG. 16 is an instruction level flowchart illustrating a billing procedure usable with the FIG. 1 illustrated machine as an asynchronous program.

Additionally, some asynchronous programs can be executed based on synchronous program execution. An example is a billing control procedure, next described. FIG. 16 illustrates procedures for actuating billing meter M as such procedures pertain to ACR. Three indicators are of interest in understanding the operation of the billing procedure. The first flag ACRBILL, when set, indicates that billing was active at the time hard stop program was called. That is, a copy sheet jam could occur during a copy exit operation. Therefore, if ACRBILL had been zero, this is an indication that the jam occurred. Also, in the flush or separation mode, it would also result in ACRBILL being zero. A second flag ACRBILL1 inhibits billing. That is, the billing meter M is not actuated. This means that the copies being supplied to output portion 14 are those being substituted for the copies lost during the copy sheet jam. ACRBILL2 is set to the active condition when the copy sheet being exited from copy production machine 10 is under the exit switch S2, S3, S4 (FIG. 5) which is designated as the billing meter switch. That is, in the non-collate mode, the copies go to exit tray 14A and switch S2 is the billing meter switch. At other time switches S3 and S4 of collators 14B, 14C are the billing meters depending on the count involved in copies during the collate mode. When images are billed, then switch S5 of ISU 40 is the billing meter of the side one portion of the duplex copy production mode.

In executing the billing procedures, programmed control 53 at 5DD3 resets the two flags, ACRBILL1 and ACRBILL2. At 5DDD, auxiliary operations are checked. In the illustrated embodiments, these auxiliary operations include emptying or flushing ISU 40, the separation mode, or pre-conditioning photoconductor drum 20.

If it is not an auxiliary operation, programmed control 53 then immediately goes to 5E97 where ACRBILL2 is set to unity. The billing procedure illustrated in FIG. 16 is invoked whenever one of the above-described billing exit switches S2, S3 or S4 (FIG. 5) is activated and has been selected as the billing exit switch. Accordingly, it is known at that time whether a copy sheet is still under the designated billing switch.

On the other hand, if it is an auxiliary operation, as indicated by the branch at 5DDD, then whether an ACR (recovery) is being performed is checked at 5DE3. If so, at 5DF4 a minus one is added to the numerical contents of ACRLOST register 187 (FIG. 4) and ACRBILL2 is set to one. If it is not a recovery, then at 5DFE ACRBILL1 is set to unity. Then at 5E04, ACRBILL is checked. If it is unity, ACRBILL is reset at 5E06 and ACRBILL2 is set to unity. Then at 5E0E, 5E14, 5E19, 5E1D through 5E34, data meters are incremented not pertinent to the operation of ACR. Billing meter M is incremented in the indicated non-pertinent steps 5E41 only if ACRBILL2 is zero. In the duplex mode, a duplex billing meter (not shown) is also incremented whenever ACRBILL2 is zero.

With respect to the indicators, flags, or bits of status registers 186, none of these are separately shown, it being understood that each is a bit position of registers 186. Such bit positions are accessed as any bit position of a computer or processor memory is accessed.

The described automatic copy recovery makes it possible for the operator to recover from all copy sheets misfeeds (jams) with a minimal effort. A key part of this recovery is the communication to the operator via the operator's control panel 52.

While the invention has been particularly shown and described with references to preferred embodiments thereof, it will be understood by those skilled in the art that various changes in form and details may be made therein without departing from the spirit and scope of the invention.

APPENDIX

TABLE I - SEPARATION MODE CONTROL

| LOC | OBJ | OP1 | OP2 | SOURCE STATEMENT | | |
|---|---|---|---|---|---|---|
| | | | | 1. CALL | CHKINH | CHECK FOR (¬CPPIND & ¬CKCOLTRI & ¬REMCOPYI & ¬PLSTNDBY) -- Check Inhibits |
| 5468 | 31583A | 0001 | 3A58 | BAL | R1,CHKORG | |
| | | | | 1. IF | (NO INHIBITS FROM ABOVE) & ¬ADDPAPER & ¬ACRREQ & ¬(CEMODE>5) | |
| 546B | 3CD3 | 54D3 | | BNZ | SEP06 | |
| 546D | A647 | 0047 | | TPB | PSB07,ADDPAPER | |
| 546F | 94 | 0004 | | | | |
| 5470 | 3CD3 | 54D3 | | | | |
| 5472 | A641 | 0041 | | BNZ | SEP06 | *GO IF ACTIVE |
| 5474 | 91 | 0001 | | TPB | PSB01,ACRREQ | |
| 5475 | 3CD3 | 54D3 | | BNZ | SEP06 | *GO IF SET |
| 5477 | A662 | 0062 | | LB | CEMODE | GET CE MODE BYTE |
| 5479 | A805 | 0005 | | CI | 5 | |
| 547B | 3ED3 | 54D3 | | BH | SEP06 | *GO IF GREATER THAN 5 |
| | | | | 1. THEN | | |
| | | | | 2. . IF | SEPARATE (SEPARATION DEPRESSED) | |
| 547D | A6C4 | 00C4 | | RIN | CSB05 | GET STATUS |
| 547F | 97 | 07 | | TP | SEPARATE | TEST IF BEING PUSHED |
| 5480 | 3DC9 | 54C9 | | BZ | SEP03 | *GO IF NO |
| | | | | 2. . THEN | | |
| | | | | 3. . . IF | ¬SEPARAT1 SEPARATION BEING INTEGRATED | |

| LOC | OBJ | OP1 | OP2 | | SOURCE STATEMENT | | |
|---|---|---|---|---|---|---|---|
| 5482 | A9A0 | 00A0 | | | GI | INTOFF | GET STATUS |
| 5484 | A641 | 0041 | | | LB | PSB01 | |
| 5486 | AF80 | 0007 | | | TS | SEPARAT1 | TEST IF SET |
| 5488 | 3DC6 | 54C6 | | | BZ | SEP02 | *GO IF NO |
| | | | | 3. | . THEN | | |
| 548A | AF40 | 0006 | | 4. | . . IF ¬SEPARAT2 | | SEPARATION NOT HONORED |
| 548C | 3CBF | 54BF | | | TS | SEPARAT2 | |
| | | | | | BNZ | SEP01A | *GO IF YES -- Separate Pushed |
| | | | | 4. | . . THEN | | |
| 548E | A141 | 0041 | | 5. | . . . SEPARAT2=1 | | |
| | | | | | STB | PSB01 | UPDATE |
| | | | | 5. | . . . TOGGLE SEPIND | | -- Memorize |
| 5490 | A677 | 0077 | | | LB | PCB06 | GET STATUS |
| 5492 | AD04 | 0004 | | | XI | P1(SEPARIND) | |
| 5494 | A177 | 0077 | | | STB | PCB06 | UPDATE |
| 5496 | 33F854 | 0003 | 54F8 | 5. | . . . CALL B4SEPCHK GO CHECK B4 SEPARATION | | |
| | | | | | BAL | R3,B4SEPCHK | |
| | | | | 5. | . . . IF SEPARIND | | |
| | | | | | TPB | PCB06,SEPARIND | |
| | | | | 5. | . . . THEN | | |
| 5499 | A677 | 0077 | | 6. | . . . . JZ | SEP01 | *GO IF NO |
| 549B | 92 | 0002 | | | | | |
| 549C | 49 | 5489 | | | | | |
| | | | | 5. | . . . IF ORGATDF | | |
| | | | | 6. | . . . . RIN | CSB09 | GET STATUS |
| 549D | A6D0 | 00D0 | | | TP | ORGATDF | TEST IF DOC AT SADF |
| 549F | 94 | 0004 | | | JZ | SEP01 | *GO IF NO |
| 54A0 | 49 | 54A9 | | | | | |
| | | | | 6. | . . . . THEN | | |

| LOC | OBJ | OP1 | OP2 | SOURCE STATEMENT | | |
|---|---|---|---|---|---|---|
| | | | | 7. | TSB | SEPWAIT=1 PCB01,SEPWAIT |
| 54A1 | A641 | 0041 | | | | |
| 54A3 | AF20 | 0005 | | | | Separate waits for |
| 54A5 | A141 | 0041 | | | | next run. |
| | | | | 6. | | ENDIF |
| 54A7 | 2CBF | 54BF | | | B | SEP01A *GO |
| | | | | 5. | | ELSE |
| 54A9 | | 54A9 | | SEP01 | DC | * |
| | | | | 6. | | RESET SEPWAIT,STARTSE |
| 54A9 | A641 | 0041 | | | TRB | PSB01,SEPWAIT |
| 54AB | B5 | 0005 | | | | |
| 54AC | A141 | 0041 | | | | |
| 54AE | A647 | 0047 | | | TRB | PSB07,STARTSE |
| 54B0 | B7 | 0007 | | | | |
| 54B1 | A147 | 0047 | | | | |
| | | | | 6. | | IF SEPACTV |
| 54B3 | A647 | 0047 | | | LB | PSB07 |
| 54B5 | B3 | 0003 | | | TR | SEPACTV |
| 54B6 | 4F | 54BF | | | JZ | SEP01A |
| | | | | 6. | | THEN |
| | | | | 7. | | RESET SEPACTV |
| 54B7 | A147 | 0047 | | | STB | PSB07 |
| | | | | 7. | | SET ENABLED |
| 54B9 | A66A | 006A | | | TSB | PSB42,ENABLED |
| 54BB | AF80 | 0007 | | | | |

| LOC | OBJ | OP1 | OP2 | | SOURCE STATEMENT | | |
|---|---|---|---|---|---|---|---|
| | | | | | 6. . . . . . ENDIF | | |
| | | | | | 5. . . . . ENDIF | | |
| | | | | | 4. . . . ENDIF | | |
| 54BD | A16A | 006A | | | 4. . . . * | | |
| | | | | SEP01A | 4. . . DC ABUTTON=1 | | |
| | | | | | TSB PSB28,ABUTTON | | |
| 54BF | | 54BF | | | 4. . . * | | |
| 54BF | A65C | 005C | | | 3. . . J SEP06 | | |
| 54C1 | AF02 | 0001 | | | | | |
| 54C3 | A15C | 005C | | | | | |
| 54C5 | 03 | 54D3 | | | | | |
| 54C6 | | | | SEP02 | 3. . ELSE | | |
| | | | | | 4. . . DC SEPARAT1=1 | | UPDATE |
| 54C6 | A141 | 0041 | | | STB PSB01 | | |
| 54C8 | 03 | 54D3 | | | 3. . . J SEP06 | | |
| 54C9 | | | | | 3. . ENDIF | | |
| 54C9 | | | | SEP03 | 2. . ELSE | | |
| | | | | | 3. . . DC * | | |
| | | | | | DEINTEGRATION OF SEPARATION SWITCH | | |
| | | | | | 3. . . IF SEPARAT1 | | |
| 54C9 | A9A0 | 00A0 | | | GI INTOFF | | GET STATUS |
| 54CB | A641 | 0041 | | | LB PSB01 | | TEST IF SET |
| 54CD | B7 | 0007 | | | TR SEPARAT1 | | *GO IF NO |
| 54CE | 40 | 54D0 | | | JZ SEP04 | | |
| | | | | | 3. . . THEN | | |
| | | | | | 4. . . . DC SEPARAT1=0 | | |
| | | | | | J SEP05 | | |
| 54CF | 01 | 54D1 | | | | | |
| 54D0 | | | | SEP04 | 3. . . ELSE | | |
| | | | | | 4. . . . DC SEPARAT2=0 | | |
| 54D0 | B6 | 0006 | | | TR SEPARAT2 | | |
| 54D1 | | | | SEP05 | 3. . . ENDIF | | |
| 54D1 | | 54D1 | | | 3. . . DC * | | |

| LOC | OBJ | OP1 | OP2 | SOURCE STATEMENT | | |
|---|---|---|---|---|---|---|
| 54D1 | A141 | 0041 | | | STB | PSB01 UPDATE |
| | | | | 2. . ENDIF | | |
| | | | | 1. ENDIF | | |
| 54D3 | A920 | 54D3 0020 | | SEP06 | DC | * |
| | | | | | GI | INTON UNMASK INTERRUPTS |
| | | | | 1. IF EXITOFLO | | |
| | | | | | SRG | COLRG |
| 54D5 | A9D0 | 00D0 | | | TPB | CPSB05,EXITOFLO |
| 54D7 | A616 | 0016 | | | | |
| 54D9 | 95 | 0005 | | | GI | INTOFFCG+BASERG |
| 54DA | A989 | 0089 | | | JZ | SEP10 |
| 54DC | 4C | 54BC | | | | |
| | | | | 1. THEN | | |
| | | | | 2. . SEPARIND=0 | | |
| 54DD | A677 | 0077 | | | TRB | PCB06,SEPARIND |
| 54DF | B2 | 0002 | | | | |
| 54E0 | A177 | 0077 | | | | |
| | | | | 2. . SEPWAIT,STARTSE | | |
| 54E2 | A641 | 0041 | | | TRB | PSB01,SEPWAIT |
| 54E4 | B5 | 0005 | | | | |
| 54E5 | A141 | 0041 | | | | |
| 54E7 | A647 | 0047 | | | TRB | PSB07,STARTSE |
| 54E9 | B7 | 0007 | | | | |
| 54EA | A147 | 0047 | | | | |
| | | | | 1. ENDIF | | |
| 54EC | A920 | 54E2 0020 | | | DC | * |
| | | | | | GI | INTON |
| | | | | ENDBEGIN SEPARATE | | |

TABLE II - ECO CODE

| LOC | OBJ | OP1 | OP2 | SOURCE STATEMENT | | | --NONPERTINENT CODE-- |
|---|---|---|---|---|---|---|---|
| | | | | 2. . | IF CR2 | | |
| 6E25 | E4 | | 0004 | | LR | CRREG | CR REGISTERS' REGISTER |
| 6E26 | 96 | | 0006 | | TP | CR2 | TEST IF CR2 IS ACTIVE |
| 6E27 | 3DB8 | | 6EB8 | | BZ | EC0E | IF CR2 NOT ACTIVE BRANCH TO CR6 TEST |
| | | | | 2. . | THEN | | |
| | | | | 3. . . | IF ¬PRECOND | | |
| 6E29 | A647 | | 0047 | | TPB | PSB07,PRECOND | |
| 6E2B | 90 | | 0000 | | | | |
| 6E2C | 3CB8 | | 6EB8 | | BNZ | EC0E | |
| | | | | 3. . . | THEN | | |
| | | | | 4. . . . | CCTRSAVE=CPYCTR+ 1 | | |
| 6E2E | E7 | | 0007 | | LR | CPYCTR | |
| 6E2F | 2E | | | | A1 | | |
| 6E30 | 85 | | 0005 | | STR | CCTRSAVE | |
| 6E31 | AB0F | | 000F | | NI | X'0F' | |
| 6E33 | AB0A | | 000A | | CI | 10 | |
| 6E35 | 6F | | 6E3F | | JNE | ECOD3A1 | |
| 6E36 | E5 | | 0005 | | LR | CCTRSAVE | |
| 6E37 | AC06 | | 0006 | | AI | 6 | |
| 6E39 | A A0 | | 00A0 | | CI | X'A0' | |
| 6E3B | 6E | | 6E3E | | JNE | ECOD3A | |
| 6E3C | AC60 | | 0060 | | AI | X'60' | |
| ECOD3A 6E3E | | | 6E3E | | DC | * | |
| 6E3E | 85 | | 0005 | | STR | CCTRSAVE | |
| ECOD3A1 6E3F | | | 6E3F | | DC | * | |
| | | | | 4. . . . | IF ¬STOP2 &¬TNRFAIL &¬TNRCPP &¬COLSTOP | | |
| 6E3F | A657 | | 0057 | | TPB | PSB23,STOP2 | |
| 6E41 | 91 | | 0001 | | | | |
| 6E42 | 3CB8 | | 6EB8 | | BNZ | EC0E | |

| LOC | OBJ | OP1 | OP2 | SOURCE STATEMENT | | |
|-----|-----|-----|-----|------|------|------|
| 6E44 | A65D | 005D | | LB | CPP | |
| | | | | TSM | P(TNRFAIL,TNRCPP) | |
| 6E46 | AF82 | 0082 | | BNZ | ECOE | |
| 6E48 | 3CB8 | 6EB8 | | SRG | COLRG | |
| 6E4A | A9D0 | 00D0 | | TPB | CPSB08,COLSTOP | |
| 6E4C | A619 | 0019 | | | | |
| 6E4E | 97 | 0007 | | SRG | INTHRG | |
| 6E4F | A9C8 | 00C8 | | BNZ | ECOE | |
| 6E51 | 3CB8 | 6EB8 | | | THEN | |
| | | | | 4. | IF | SIDE 2 ACTIVE |
| | | | | 5. | TPB | PSB20,DPXSIDE2 |
| 6E53 | A654 | 0054 | | BZ | ECOD3 | |
| 6E55 | 95 | 0005 | | | THEN | |
| 6E56 | 3DA9 | 6EA9 | | . . . | DC | * |
| | | | | 6. | | IF COPIES IN DUPLEX |
| ECOD | | | | . . . | RIN | CSB06 |
| 6E58 | 6E58 | | | | | |
| 6E58 | A6C5 | 00C5 | | TP | CPYINDP | |
| 6E5A | 92 | 0002 | | BZ | ECOD1 | |
| 6E5B | 3D89 | 6E89 | | | THEN | |
| | | | | 6. | . | IF COLLATE IND & (CCTRSAVE>19 -39 IF MOD2 PRESENT) |
| | | | | 7. | | & SEPSLCT=0 & −COLOFLO |
| | | | | | TPB | PCB06,COLATIND |
| 6E5D | A675 | 0075 | | BZ | ECOW01 | |
| 6E5F | 91 | 0001 | | CLA | | |
| 6E60 | 3D7F | 6E7F | | RIN | CSB14 | |
| 6E62 | 25 | | | | | |
| 6E63 | A6D5 | 00D5 | | | | |

| LOC | OBJ | OP1 | OP2 | | SOURCE STATEMENT | |
|---|---|---|---|---|---|---|
| 6E65 | 96 | | | | TP | MD2PRES |
| 6E66 | AE19 | 0006 | | | LI | X'19' 19 COPIES |
| 6E68 | 4B | 6E6B | | | JZ | ECOW02 |
| 6E69 | AE39 | 0039 | | | LI | X'39' 39 COPIES |
| 6E6B | C5 | 0005 | | | SR | CCTRSAVE |
| 6E6C | 3F7F | 6E7F | | | BNL | ECOW01 |
| | | | | | SRG | BASERG |
| 6E6E | A9C9 | 00C9 | | ECOW02 | CLA | |
| 6E70 | 25 | | | | AR | SEPSLCT |
| 6E71 | D9 | 0009 | | | BNZ | ECOW01 |
| 6E72 | 3C7F | 6E7F | | | SRG | COLRG |
| 6E74 | A9D0 | 00D0 | | | TPB | CPSB04,COLOFLO |
| 6E76 | A609 | 0009 | | | JNZ | ECOW01 |
| | | | | 7. | . | . THEN |
| | | | | 8. | . | . SET COLOFLOR |
| 6E78 | 95 | 0005 | | | TS | COLOFLOR |
| 6E79 | 6F | 6E7F | | | STB | CPSB04 |
| | | | | | J | ECOW03 |
| | | | | 7. | . | . ELSE |
| 6E7A | AF40 | 0006 | | ECOW01 | EQU | * |
| 6E7C | A109 | 0009 | | | SRG | INTHRG |
| 6E7E | 05 | 6E85 | | | | |
| | | | | 8. | . | . SET CR1 |
| 6E7F | A9C8 | 00C8 | | | LR\ | CRREG |
| 6E81 | E4 | 0004 | | | TS | CR1 |
| 6E82 | AF80 | 0007 | | | STR | CRREG |
| 6E84 | 84 | 0004 | | | | ENDIF |
| | | | | ECOW03 | SRG | INTHRG |
| 6E85 | A9C8 | 00C8 | | | | |

| LOC | OBJ | OP1 | OP2 | SOURCE STATEMENT | | |
|---|---|---|---|---|---|---|
| 6E87 | 2CA8 | 6EA8 | | | B | ECOD2 |
| | | | | | ELSE | |
| | | 6E89 | | ECOD1 | DC | * |
| | | | | 6. . . . . . . . | SET END=1 | |
| | | | | 7. . . . . . . . | TSB | PSB03,END |
| 6E89 | A643 | 0043 | | | | |
| 6E8B | AF80 | 0007 | | | | |
| 6E8D | A143 | 0043 | | | | |

--NONPERTINENT CODE--

| | | | | | | |
|---|---|---|---|---|---|---|
| | | | | 6. . . . . . . . | IF | CCTRSAVE LESS THAN CPYSLCT |
| 6EA9 | E5 | 0005 | | | LR | CCTRSAVE |
| 6EAA | C9 | 0009 | | | SR | CPYSLCT |
| 6EAB | 3FB2 | 6EB2 | | | BNL | ECOD4 |
| | | | | | THEN | |
| | | | | 6. . . . . . . . | | SET CR1=1 |
| 6EAD | E4 | 0004 | | | LR | CRREG |
| 6EAE | AF80 | 0007 | | | TS | CR1 |
| 6EB0 | 84 | 0004 | | | STR | CRREG |
| 6EB1 | 08 | 6EB8 | | | J | ECOE |
| | | | | | ELSE | |
| | | 6EB2 | | ECOD4 | DC | * |
| | | | | 7. . . . . . . . | SET END=1 | |
| | | | | | TSB | PSB03,END |
| 6EB2 | A643 | 0043 | | | | |
| 6EB4 | AF80 | 0007 | | | | |
| 6EB6 | A143 | 0043 | | | | |
| | | | | 6. . . . . . . . | ENDIF | |
| | | | | 5. . . . . . . . | ENDIF | |
| | | | | 4. . . . . . . . | ENDIF | |
| | | | | 3. . . . ENDIF | | |
| | | | | 2. . ENDIF | | |

--NONPERTINENT CODE--

TABLE III — EC0 CR1 CODE

| LOC | OBJ | OP1 | OP2 | SOURCE STATEMENT | | |
|---|---|---|---|---|---|---|
| | | | | BEGIN EC0CR1 | | |
| | | | | 1. IF ¬PRECOND &¬CENOPAPR | | |
| 7006 | A647 | 0047 | | TPB | PSB07,PRECOND | |
| 7008 | 90 | | | BNZ | EC0K5 | |
| 7009 | 3C7D | 707D | | LB | CEMODE | |
| 700B | A662 | 0062 | | CI | CENOPAPR | |
| 700D | A803 | 0003 | | BE | EC0K5 | |
| 700F | 3D7D | 707D | | | | |
| | | | | 1. . THEN | | |
| | | | | 2. . . IF CR1 | | |
| 7011 | E4 | 0004 | | LR | CRREG | |
| 7012 | 97 | 0007 | | TP | CR1 | |
| 7013 | 3D7D | 707D | | BZ | EC0K5 | |
| | | | | 2. . . THEN | | |
| | | | | 3. . . . RESET ALL TRUCKS | | |
| 7015 | A671 | 0071 | | LB | PCB02 | |
| 7017 | ABE3 | 00E3 | | TRM | P(DPLXTRCK,ALTTRUCK,PRMTRCK) RESET ALL TRUCKS FIRST | | |
| 7019 | 29 | | | | | |
| | | | | 3. . . IF SEPSTBY | | |
| | | | | TPB | PLSTNDBY,SEPSTBY | |
| 701A | A653 | 0053 | | | | |
| 701C | 95 | 0005 | | JZ | EC0K1 | *GO TO NEXT TEST IF NOT SEPARATION |
| 701D | 43 | 7023 | | | | |
| | | | | 3. . . THEN | | |
| | | | | 4. . . . SET ALTERNATE TRUCK | | |
| | | | | TRA | RETURN TRUCK STATUS BYTE | |
| 701E | 29 | | | TS | ALTTRUCK  SET ALTERNATE TRUCK | |
| 701F | AF08 | 0003 | | B | EC0K4 | |
| 7021 | 2C61 | 7061 | | | | |

--NONPERTINENT CODE--

TABLE IV - EC2 CODE

| LOC | OBJ | OP1 | OP2 | | SOURCE STATEMENT | |
|---|---|---|---|---|---|---|
| | | | | | -- NONPERTINENT CODE -- | |
| | | | | 5. . . . . | IF | (¬COLBNFL &¬SEPARATE &(¬B4 \|(¬BNLGTB4 &(¬SELPAPE |
| | | | | | | \|SELPAPD \|SELPAPC \|SELPAPB)) \|(SELPAPE &(SELPAPE |
| | | | | | | \|((SELPAPD \|SELPAPC \|SELPAPB) &IMPACTU))) |
| 718A | A6D5 | 00D5 | | | RIN | CSB14 |
| 718C | 91 | 0001 | | | TP | COLBNFL |
| 718D | 3CC0 | 71C0 | | | BNZ | EC2COL3 |
| | | | | | TPB | PCB06,SEPARIND   -- Separate mode. |
| 718F | A677 | 0077 | | | | |
| 7191 | 92 | 0002 | | | BNZ | EC2COL3  -- EC2 time. |
| 7192 | 3CC0 | 71C0 | | | LBL | COUNTRY |
| 7194 | A6A1 | 01A1 | | | TP | B4 |
| 7196 | 92 | 0002 | | | BZ | EC2COL2E |
| 7197 | 3DB5 | 71B5 | | | RIN | CSB13 |
| 7199 | A6D4 | 00D4 | | | TRA | |
| 719B | 29 | | | | RIN | CSB14 |
| 719C | A6D5 | 00D5 | | | TP | BNLGTB4 |
| 719E | 97 | 0007 | | | TRA | EC2COL2A |
| 719F | 29 | | | | JNZ | P(SELPAPE,SELPAPD,SELPAPC,SELPAPB) |
| 71A0 | 65 | 71A5 | | | NI | EC2COL2E |
| 71A1 | AB1E | 001E | | | BNZ | * |
| 71A3 | 3CB5 | 71B5 | | EC2COL2A DC | | SELPAPE |
| 71A5 | 94 | 0004 | | | TP | SELPAPE |
| 71A6 | 4C | 71AC | | | JZ | EC2COL2B |
| 71A7 | A681 | 0181 | | | LBL | PSB65 |
| 71A9 | 90 | 0000 | | | TP | IMPACTU |
| 71AA | 45 | 71B5 | | | JZ | EC2COL2E |

| LOC | OBJ | OP1 | OP2 | SOURCE STATEMENT | | |
|---|---|---|---|---|---|---|
| 71AB | 03 | 71B3 | | | J | EC2COL2C |
| | | 71AC | | EC2COL2B DC | * | |
| 71AC | AB0E | 000E | | | NI | P(SELPAPD,SELPAPC,SELPAPB) |
| 71AE | 43 | 71B3 | | | JZ | EC2COL2C |
| 71AF | A681 | 0181 | | | LBL | PSB65 |
| 71B1 | 90 | 0000 | | | TP | IMPACTU |
| 71B2 | 65 | 71B5 | | | JNZ | EC2COL2E |
| 71B3 | 2CC0 | 71B3 | | EC2COL2C DC | B | EC2COL3 |
| | | | | 5. . . . THEN | | |
| 71B5 | | | | EC2COL2E DC | * | |
| | | | | 6. . . . . EXITOFLO=1 -- Exit original from SADF. | | |
| | | | | | SRG | COLRG |
| 71B5 | A9D0 | 00D0 | | | TSB | CPSB05,EXITOFLO |
| 71B7 | A616 | 0016 | | | | |
| 71B9 | AF20 | 0005 | | | SRG | INTHRG |
| 71BB | A116 | 0016 | | | | |
| 71BD | A9C8 | 00C8 | | | J | EC2COL4 |
| 71BF | 06 | 71C6 | | | | |
| | | | | 5. . . ELSE | | |
| 71C0 | | 71C0 | | EC2COL3 DC | * | |
| | | | | 6. . . . REMCOPYI=1 | | |
| 71C0 | A676 | 0076 | | | TSB | PCB05,REMCOPYI |
| 71C2 | AF01 | 0000 | | | | |
| 71C4 | A176 | 0076 | | | | |
| | | | | 5. . . . ENDIF | | |
| | | | | 4. . . ENDIF | | |
| | | | | 3. . ENDIF | | |
| 71C6 | | 71C6 | | EC2COL4 DC | * | |
| | | | | 3. . IF REMCOPYI | | |
| | | | | | TPB | PCB05,REMCOPYI |

| LOC | OBJ | OP1 | OP2 | SOURCE STATEMENT | | |
|---|---|---|---|---|---|---|
| 71C6 | A676 | 0076 | | | | |
| 71C8 | 90 | 0000 | | | | |
| 71C9 | 3DDC | 71DC | | B2 | THEN | EC2A |
| | | | | 3. . THEN | | |
| | | | | 4. . . . DEACTIVATE CR1 &RESET | | |
| | | | | (CRB,CRA,CRA0,CRA1,CRA3,CRA3,CRA4,CRA5) | | |
| 71CB | E4 | 0004 | | LR | CRREG | LOAD OR REGISTERS' REGISTER |
| 71CC | B7 | 0007 | | TR | CR1 | DEACTIVATE CR1 |
| 71CD | 84 | 0004 | | STR | CRREG | STORE OR REGISTERS' REGISTER |
| 71CE | 25 | | | CLA | | CLEAR ACCUM |
| 71CF | A114 | 0014 | | STB | CRHI | RESET HIGH BYTE OF CR REGISTER |
| | | | | 4. . . . RESET STARTL | | |
| 71D1 | A656 | 0056 | | | TRB | PSB22,STARTL |
| 71D3 | B6 | 0006 | | | | |
| 71D4 | A156 | 0056 | | | | |
| | | | | 4. . . . RESET FLUSH PLEASE STANDBY (FLSHPLSB) AND | | |
| | | | | | SEPARATION PLEASE STANDBY (SEPSTBY) | |
| | | | | | PLSTNDBY,P(FLSHPLSB,SEPSTBY) | |
| 71D6 | A653 | 0053 | | | TRMB | |
| 71D8 | ABDB | 00DB | | | | |
| 71DA | A153 | 0053 | | | | |
| | | | | 3. . ENDIF | | |
| | | | | 2. . ENDIF | | |
| | | | | 1. ENDIF | | |
| | | | | -- NONPERTINENT CODE -- | | |

TABLE V - EC5 CODE

| LOC | OBJ | OP1 | OP2 | SOURCE STATEMENT | | |
|---|---|---|---|---|---|---|
| | | | | BEGIN | EC5 CODE | |
| | | | | DC | * | |
| | | | | 1. IF | CR2 | |
| 7367 | A004 | 7367 | | LB | CRREG | LOAD CR REGISTERS' REGISTER |
| 7369 | 96 | 0004 | | TP | CR2 | TEST FOR CR2 |
| 736A | 3D86 | 0006 | | BZ | EC5A | IF CR2 NOT ACTIVE JUMP TO CR3 TEST |
| | | 7386 | | 1. THEN | | |
| | | | | 2. . IF | ¬FLUSH &¬FUSER BYPASS &¬PRECOND &(¬SEPSTBY) |  |
| 736C | A653 | 0053 | | TP | PLSTNDBY,FSRPLSB | |
| 736E | 91 | 0001 | | | | |
| 736F | 3C86 | 7386 | | BNZ | EC5A | |
| 7371 | A647 | 0047 | | LB | PSB07 | GET STATUS |
| | | | | TSM | P(PRECOND,FLUSH) | |
| 7373 | AF03 | 0003 | | BNZ | EC5A | |
| 7375 | 3C86 | 7386 | | TPB | PLSTNDBY,SEPSTBY | |
| 7377 | A653 | 0053 | | | | |
| 7379 | 95 | 0005 | | JZ | EC5S1 | |
| 737A | 4F | 737F | | LR | ACRREG | |
| 737B | EE | 000E | | NI | X'F0' | |
| 737C | ABF0 | 00F0 | | JZ | EC5A | |
| 737E | 46 | 7386 | | | | |
| | | | | 2. . THEN | | |
| | | | | 3. . . DC | EC551 * | INTERIMAGE ERASE OFF |
| 737F | A67D | 007D | | LB | PCB15 | |
| 7381 | B4 | 0004 | | TR | INTIMGER | |
| | | | | STOUT | 15 | |
| 7382 | A17D | 007D | | STB | PCB15 | |
| 7384 | A1D6 | 00D6 | | STB | CCB15 | |
| | | | | 2. . ENDIF | | |
| | | | | 1. ENDIF | | |
| | | | | --NONPERTINENT CODE-- | | |

TABLE VI – EC6 CODE

```
LOC   OBJ        OP1   OP2    SOURCE STATEMENT

1. IF  CR2 &END
73E9  E4         0004             LR    CRREG         GET CR REG
73EA  96         0006             TP    CR2           SEE IF CR2
73EB  3512       7412             BZ    EC6B        * GO IF YES
                                  TPB   PSB03,END
73ED  A643  0043
73EF  97    0007                  BZ    EC6B
73F0  3512  7412               1. THEN
                               2. . IF  SEPSTBY &DELAYSTL
                                    TPB   PLSTNDBY,SEPSTBY
73F2  A653  0053
73F4  95    0005                    JZ    EC6A
73F5  42    7402                    TPB   PSB03,DELAYSTL
73F6  A643  0043
73F8  92    0002                    JZ    EC6A
73F9  42    7402               2. . THEN
                               3. . . DOCLAMP ON
73FA  A67A  007A                    TSB   PCB12,DOCLAMP
73FC  AF10  0004
73FE  A17A  007A
7400  2C12  7412                    B     EC6B

--NONPERTINENT CODE--
```

TABLE VII - SET START LATCH

```
LOC    OBJ           OP1    OP2         SOURCE STATEMENT

-- NONPERTINENT CODE --

2. . IF COPY SELECT =0
3CFA   24                                    CLA
CFB    A009          0009                    CB        CPYSLLO
3CFD   64            3D)4                    JNZ       STAR025
3CFE   A019          0019                    CB        CPYSLHI
3D00   64            3D04                    JNZ       STAR025
                                        2. . THEN
                                        3. . . SET COPY SELECT =1
3D01   2E                                    A1\
3D02   A109          0009                    STB       CPYSLLO
                                        2. . ENDIF
                                        STAR025  EQU   *
                                        2. . IF END (PREVIOUS RUN COMPLETED NORMALLY)
3D04   A643          0043                    LB        PSB03
3D06   B7            0007                    TR        END
3D07   6B            3D0B                    JNZ       STAR031X
3D08   30D13E        3ED1 0000              BU         STAR031,R0
                                        2. . THEN
                                        STAR031X EQU   *
                                        3. . . PROCESS STEND PERFORMS CODE REQUIRED WHEN STARTL IS SET &
                                                      END IS ON

-- SEE TABLE XX --

STAR031  EQU   *
                                        2. . RESET ENABLED
3ED1   A66A          006A                    TRB    |  PSB42,ENABLED
3ED3   B7            0007
3ED4   A16A          006A
```

| LOC | OBJ | OP1 | OP2 | SOURCE STATEMENT |
|---|---|---|---|---|
| | | | | 2. . IF FLUSH |
| 3ED6 | A647 | 0047 | | TPB PSB07,FLUSH |
| 3ED8 | 91 | 0001 | | BZ STAR034 |
| 3ED9 | 3DF4 | 3EF4 | | |
| | | | | 2. . THEN |
| | | | | 3. . . SET FLUSH PLEASE STANDBY |
| 3EDB | A653 | 0053 | | TSB PSB19,FLSHPLSB |
| 3EDD | AF04 | 0002 | | |
| 3EDF | A153 | 0053 | | |
| | | | | 3. . . PICK DUPLEX TRUCK |
| 3EE1 | A673 | 0073 | | TSB PCB02,DPLXTRCK |
| 3EE3 | AF04 | 0002 | | |
| 3EE5 | A173 | 0073 | | |
| | | | | 3. . . TURN OFF DOCUMENT LAMP |
| 3EE7 | A67C | 007C | | TRB PCB12,DOCLAMP |
| 3EE9 | B4 | 0004 | | |
| 3EEA | A17C | 007C | | |
| | | | | 3. . . TURN OFF ALL EDGE ERASE LAMPS (ERS0, ERS1, ERS2, ERS3, B4ERS3, B4ERSR1, B4ERSR2) |
| 3EEC | A672 | 0072 | | TRMB PCB01,P(ERS0,ERS1,ERS2,ERS3,B4ERS3,BR34SR1,B4ERSR2) |
| 3EEE | AB01 | 0001 | | |
| 3EF0 | A712 | 0072 | | |
| 3EF2 | 244C | 3F4C | | B STARC00 |
| | | | | . ELSE |
| | | | | STAR034 EQU * |
| | | | | 3. . IF STARTSE |
| 3EF4 | A647 | 0047 | | TPB PSB07,STARTSE |
| 3EF6 | 97 | 0007 | | BZ STAR034A |
| 3EF7 | 351F | 3F1F | | |

| LOC | OBJ | OP1 | OP2 | SOURCE STATEMENT | | |
|---|---|---|---|---|---|---|
| | | | | 3. | . THEN | |
| | | | | 4. | . . SET SEPACTV | |
| 3EF9 | AF08 | 0003 | | | TS | SEPACTV |
| 3EFB | A147 | 0047 | | | STB | PSB07 |
| | | | | 4. | . . IF PAPER PRESENT IN ALTERNATE BIN (CHECK PAPER PRESENT SW DIRECTLY) | |
| 3EFD | A6C3 | 00C3 | | | RIN | CSB04 |
| 3EFF | 97 | 0007 | | | TP | ALTPRES |
| 3F00 | 48 | 3F08 | | | J2 | STARI01 |
| | | | | 4. | . . THEN | |
| | | | | 5. | . . . SET SEPSTBY | |
| 3F01 | A653 | 0053 | | | TSB | PLSTNDBY,SEPSTBY |
| 3F03 | AF20 | 0005 | | | | |
| 3F05 | A153 | 0053 | | | | |
| 3F07 | 02 | 3F12 | | | J | STARI02 |
| | | | | 4. | . ELSE | |
| | | | | STARI01 EQU | * | |
| | | | | 5. | . . RESET STARTSE, STARTL | |
| 3F08 | A656 | 0056 | | | TRB | PSB22,STARTL |
| 3F0A | B6 | 0006 | | | | |
| 3F0B | A156 | 0056 | | | | |
| 3F0D | A647 | 0047 | | | TRB | PSB07,STARTSE |
| 3F0F | B7 | 0007 | | | | |
| 3F10 | A147 | 0047 | | | | |
| | | | | 4. | . ENDIF | |
| | | | | STARI02 EQU | * | |
| | | | | 4. | . TURN OFF DOCUMENT LAMP | |
| 3F12 | A67C | 007C | | | TRB | PCB12,DOCLAMP |
| 3F14 | B4 | 0004 | | | | |
| 3F15 | A17C | 007C | | | | |

| LOC | OBJ | OP1 | OP2 | SOURCE STATEMENT |
|---|---|---|---|---|
| | | | | 4. . . . TURN OFF ALL EDGE ERASE LAMPS (ERS0, ERS1, ERS2, ERS3, B4ERS3, B4ERSR1, B4ERSR2) |
| | | | | PCB01,P(ERS1,ERS2,ERS3,B4ERS3,B4ERSR1,B4ERSR2) |
| 3F17 | A672 | 0072 | | TRMB |
| 3F19 | AB01 | 0001 | | |
| 3F1B | A172 | 0072 | | |
| 3F1D | 2C4C | 3F4C | | B STARC00 |
| | | | | 3. . ELSE |
| | | | | STAR034A EQU * |
| | | | | 4. . . SET ENABLED |
| 3F1F | A66A | 006A | | TSB PSB42,ENABLED |
| 3F21 | AF80 | 0007 | | |
| 3F23 | A16A | 006A | | |
| | | | | 4. . . IF .SADFBUSY |
| 3F25 | A65F | 005F | | TPB PSB31,SADFBUSY |
| 3F27 | 93 | 0003 | | |
| 3F28 | 6D | 3F2D | | JNZ STAR034B |
| | | | | 4. . . . THEN |
| | | | | 5. . . . . SET INHFD1 |
| 3F29 | AF20 | 0005 | | TS INHFD1 |
| 3F2B | A15F | 005F | | STB PSB31 |
| | | | | 4. . . . ENDIF |
| | | | | STAR034B EQU * |
| | | | | 4. . . IF DRIVE |
| 3F2D | A655 | 0055 | | TPB PSB21,DRIVE |
| 3F2F | 90 | 0000 | | |
| 3F30 | 4E | 3F3E | | JZ STAR049 |
| | | | | 4. . . . THEN |
| | | | | 5. . . . . OUTPUT - TURN ON DOCUMENT LAMP |
| | | | | TSB PCB12,DOCLAMP |

| LOC | OBJ | OP1 | OP2 | SOURCE STATEMENT |
|---|---|---|---|---|
| | | | | -- NONPERTINENT INSTRUCTION -- |
| | | | | 4. . . ELSE |
| | | | | STAR049 EQU * |
| | | | | 5. . . . IF SIDE-2 |
| 3F31 | A67C | 007C | | TPB PSB20,DPXSIDE2 |
| 3F33 | AF10 | 0004 | | |
| 3F35 | A17C | 007C | | |
| | | | | 5. . . . . THEN |
| 3F37 | A66F | 006F | | JZ STAR032A |
| 3F39 | AF10 | 0004 | | |
| 3F3B | A16F | 006F | | |
| 3F3D | 0C | 3F4C | | |
| | | | | 6. . . . . . PICK DUPLEX TRUCK |
| 3F3E | A654 | 0054 | | TSB PCB02,DPLXTRCK |
| 3F40 | 95 | 0005 | | |
| 3F41 | 49 | 3F49 | | |
| | | | | 5. . . . . ELSE |
| | | | | STAR032A EQU * |
| | | | | 6. . . . . . BACKUP=0 |
| 3F42 | A673 | 0073 | | CLA BACKUP |
| 3F44 | AF04 | 0002 | | |
| 3F46 | A173 | 0073 | | STB BACKUP |
| 3F48 | 0C | 3F4C | | |
| | | | | 5. . . . . ENDIF |
| | | | | STAR032B EQU * |
| | | | | 4. . . ENDIF |
| | | | | STAR032 EQU * |
| 3F49 | 25 | | | J STAR032B |
| 3F4A | A16C | 006C | | |

```
LOC    OBJ   OP1   OP2        SOURCE STATEMENT

3. . . ENDIF
                              2. . ENDIF
                       STARC00 EQU    *
                              1. ENDIF
                       STAR033 EQU    *
                              1. IF STARTL
3F4C  A656  0056                 TPB   PSB22,STARTL
3F4E  96    0006
3F4F  3DD4  3FD4
                              1. THEN        BZ    |STARI00
                              2. . PROCESS SETCR SETS APPROPRIATE CR BIT& 1ST SYNC & 1ST EMIT
                              -- NONPERTINENT CODE --
                              1. SLCTTM=0 -(PREVENTS NUMERIC SELECTION); NEWSLCT=1 -(NEXT
                                              NUMERIC BUTTON IS 1ST)
3FD6  A66A  006A                 LB    PSB42
3FD8  B1    0001                 TR    SLCTTM
3FD9  AF10  0004                 TS    NEWSLCT
3FDB  A16A  006A                 STB   PSB42
                              1. IF STARTB
3FDD  A656  0056                 TPB   PSB22,STARTB
3FDF  95    0005
3FE0  47    3FE7
                              1. THEN        JZ    STAR034C
                              2. . SETSTARTH (START BUTTON HONORED)
3FE1  A657  0057                 TSB   PSB23,STARTH
3FE3  AF10  0004
3FE5  A157  0057
                              1. ENDIF
                       STAR034C EQU   *
```

| LOC | OBJ | OP1 | OP2 | SOURCE STATEMENT |
|---|---|---|---|---|
| | | | | 1. IF MOMRUNB |
| 3FE7 | A655 | 0055 | | TPB PSB21,MOMRUNB |
| 3FE9 | 95 | 0005 | | |
| 3FEA | 4F | 3FEF | | JZ STAR024 |
| | | | | 1. THEN |
| | | | | 2. . MOMRUNH =1 (REQUIRES MOMRUN BUTTON TO BE RELEASED BEFORE STARTL CAN BE SET AGAIN) |
| 3FEB | AF08 | 0003 | | TS MOMRUNH |
| 3FED | A155 | 0055 | | STB PSB21 |
| | | | | 1. ENDIF |
| | | | | STAR024 EQU * |
| | | | | 1. RESET ALL RECOPY LIGHTS |
| 3FEF | A67D | 007D | | TRMB PCB13,P(RECOPY1,RECOPY2,RECOPY3) |
| 3FF1 | AB7C | 007C | | |
| 3FF3 | A17D | 007D | | |
| | | | | 1. RESET STLREQ, STARTDF, STARTFL, STARTPC, STARTSE |
| 3FF3 | A656 | 0056 | | TRMB PSB22,P(STLREQ,STARTDF,STARTFL,STARTPC) |
| 3FF7 | AB74 | 0074 | | |
| 3FF9 | A156 | 0056 | | |
| 3FFB | A647 | 0047 | | TRB PSB07,STARTSE |
| 3FFD | B7 | 0007 | | |

-- NONPERTINENT CODE --

TABLE VIII – SADF CODE

| LOC | OBJ | OP1 | OP2 | | SOURCE STATEMENT | | |
|---|---|---|---|---|---|---|---|
| | | | | | -- NONPERTINENT CODE -- | | |
| | | | | 4. . . . | CALL | CHKINH | |
| | | | | | BAL | R1,CHKORG | |
| | | | | 4. . . . | IF | ¬(ANY INHIBITS FOUND ABOVE) & ¬(ACRREQ & (BACKUP>1 | (BACKUP=1 & AUTOFLSH))) & INTLOCK & ¬INDF & ¬INHFD1 & ¬INHFD2 & ¬INHFD3 & ¬COLL DOORS OPEN & PSBIND & ¬SADFBUSY & (¬ADDPAPER | CPYINDPI) & (¬SEPIND | SEPWAIT | ¬DRIVE) & ¬FLUSH & (¬SEPACTV | DRIVE) | |
| 488F | 340C | | | | BNZ | SADF27 | |
| | | | | | TPB | PSB01,ACRREQ | |
| 4891 | A641 | 0041 | | | JZ | SADF19B | |
| 4893 | 91 | | | | LB | BACKUP | |
| 4894 | 41 | 0001 | | | CI | 1 | |
| 4895 | A66C | 48A1 | | | BH | SADF27 | |
| 4897 | A801 | 006C | | | JNE | SADF19B | |
| 4899 | 360C | 0001 | | | TPB | PSB01,AUTOFLSH | |
| 489B | 61 | 490C | | | | | |
| | | 48A1 | | | | | |
| 489C | A641 | 0041 | | | BNZ | SADF27 | |
| 489E | 92 | 0002 | | SADF19B | DC | * | |
| 489F | 340C | 490C | | | RIN | CSB03 | GET STATUS |
| | | 48A1 | | | | | |
| 48A1 | A6C2 | 00C2 | | | TP | INTLOCK | TEST FOR PLUGGABLE METER |
| 48A3 | 97 | 0007 | | | | | |

| LOC | OBJ | OP1 | OP2 | | SOURCE STATEMENT | |
|---|---|---|---|---|---|---|
| 48A4 | 350C | 490C | | | BZ | SADF27 *GO IF NO |
| 48A6 | A65F | 005F | | | LB | PSB31 |
| 48A8 | ABF8 | 00F8 | | | NI | P1(INDF,INHFD1,INHFD2,SADFBUSY,INHFD3) |
| 48AA | 340C | 490C | | | BNZ | SADF27 |
| | | | | | SRG | COLRG |
| 48AC | A9D0 | 00D0 | | | LB | CPSB02 |
| 48AE | A607 | 0007 | | | SRG | BASERG |
| 48B0 | A9C9 | 00C9 | | | TSM | P(COLDR12,COLDR22) |
| 48B2 | AF50 | 0050 | | | BNZ | SADF27 |
| 48B4 | 340C | 490C | | | TPB | PCB13,PLSSTBY |
| 48B6 | A67D | 007D | | | BNZ | SADF27 |
| 48B8 | 96 | 0006 | | | TPB | PSB07,ADDPAPER |
| 48B9 | 340C | 490C | | | | |
| 48BB | A647 | 0047 | | | BNZ | SADF27 |
| 48BD | 94 | 0004 | | | TPB | |
| 48BE | 44 | 48C4 | | | JZ | SADF24A |
| | | | | | TPB | PCB13,CPYINDPI |
| 48BF | A67D | 007D | | | BZ | SADF27 |
| 48C1 | 93 | 0003 | | | DC | * |
| 48C2 | 350C | 490C | | | TPB | PCB06,SEPARIND |
| | | 48C4 | | SADF24A | | |
| 48C4 | A677 | 0077 | | | | |
| 48C6 | 92 | 0002 | | | | |

| LOC | OBJ | OP1 | OP2 | | SOURCE STATEMENT | | |
|---|---|---|---|---|---|---|---|
| 48C7 | 41 | 48D1 | | | JZ | SADF24B | *GO IF NOT SEPARATE INDICATOR |
| | | | | | TPB | PSB01,SEPWAIT | |
| 48C8 | A641 | 0041 | | | | | |
| 48CA | 95 | 0005 | | | JNZ | SADF24B | *GO IF YES |
| 48CB | 61 | 48D1 | | | TPB | PSB21,DRIVE | |
| 48CC | A655 | 0055 | | | BNZ | SADF27 | *GO-CONDITIONS WERE NOT FAVORABLE |
| 48CE | 90 | 0000 | | | EQU | * | |
| 48DF | 340C | 490C | | SADF24B | TPB | PSB07,FLUSH | |
| 48D1 | A647 | 0047 | | | BNZ | SADF27 | |
| 48D3 | 91 | 0001 | | | TP | SEPACTV | |
| 48D4 | 340C | 490C | | | JZ | SADF24C | |
| 48D6 | 93 | 0003 | | | TPB | PSB21,DRIVE | |
| 48D7 | 4D | 48DD | | | | | |
| 48D8 | A655 | 0055 | | | BZ | SADF27 | |
| 48DA | 90 | 0000 | | | | | |
| 48DB | 350C | 490C | | | | | |

4. . . . THEN

-- NONPERTINENT CODE --
(LOCATION 48DD)

5. . . . . ELSE

-- NONPERTINENT CODE --
(LOCATION 490C)

Having thus described my invention, what I claim as new, and desire to secure by Letters Patent is:

1. A copy production machine having copy production means, image input means coupled to said copy production means for supplying images thereto, and output means for receiving copies produced by said copy producing portion, and control panel means for providing input parameters, characterized by;
    programmed control means for controlling the machine and having a read/write memory means for storing status signals representative of machine copy producing states and programmed control states,
    asynchronous means in said programmed control for periodically and asynchronously scanning machine states including machine operating states and control panel parameters, said asynchronous means including means in communication relations with said memory means for exchanging signals therewith representative of the machine states, and
    synchronous means responsive to said copy production means for operating a predetermined portion of said machine in synchronism with said copy production means and including means in communication relationship with said memory means for exchanging data signals therewith whereby said asynchronous and synchronous means operate independently except for communication therebetween using said memory means wherein both said means exchange signals representative of the execution of the respective functions therein.

2. In a copy production machine having input image means for providing images to be copied, copy production means responsive to said input image means and operating in steps for producing copies of the image provided, output means for receiving produced copies from said copy production means, programmable control means for providing control signals in timed relation to operate said machine, memory means for storing groups of instruction sequences comprising programs for execution by said control means, transducer means disposed within said machine for providing condition signals indicative of conditions within said production machine, said first timing means for producing timing signals synchronized with the steps of said copy production means, the improvement comprising:
    second timing means for producing time periodic signals, and
    means for dichotomizing said programs stored in said memory means, said dichotomizing means comprising
        interrupt means responsive to said second timing means for causing said programmable control means to execute a first group of said instruction sequences that cause said condition signals to be sensed and stored in said memory means, and
        normal means responsive to said first timing means and conditions stored in said memory means for causing said programmable control means to execute a second group of said instruction sequences that cause said machine to be operated in steps according to said second group of said instruction sequences in a manner depending on the conditions stored in said memory means.

3. The invention as claimed in claim 2 wherein said normal means includes inhibiting means for preventing said interrupt means from causing said programmable control means to execute said first group of said instruction sequences while said second group of said instruction sequences is being executed.

4. The invention as claimed in claim 3 wherein said copy production includes
    console means having control panel means for disposing switch means for actuation by an operator to provide input parameters for controlling machine operation and disposing indicator means for displaying output parameters to the operator,
    first register means coupled to said switch means for providing condition signals to be included in the conditions scanned by said first group of said instruction sequences, and
    second register means coupled to operate said indicator means for receiving control signals from said control means in said copy production machine.

5. The invention as claimed in claim 4 wherein said copy production machine includes power input means for receiving a.c. line voltage and said second timing means includes zero-crossing detecting means coupled to said power input means for producing periodic signals each time the input voltage has a value of zero.

6. A method for operating a copy production machine, which supplies state signals representative of the status of operating components within said machine, using a programmed controller comprising the steps of:
    executing a first control program which includes the steps of
        sensing the state signals periodically and asynchronously with relation to the operation of said copy production machine, and
        storing said state signals; and
    executing a second control program which includes the steps of
        retrieving the stored state signals, and
        combining the retrieved state signals with predetermined parameters for producing control signals for controlling said machine operating components.

7. The invention as claimed in claim 6 including the preliminary step of
    initializing the machine operating component states to prepare for copy production.

8. The invention as claimed in claim 7 wherein said step of executing a first control program includes the further step of
    stopping the operation of said machine when an abnormal state signal is sensed.

9. The invention as claimed in claim 8 wherein the step of executing a second control program includes the further step of
    invoking the execution of said first control program as required for the execution of said second control program.

* * * * *